(12) United States Patent
Alpay et al.

(10) Patent No.: US 10,118,092 B2
(45) Date of Patent: Nov. 6, 2018

(54) VIDEO GAMING SYSTEM AND METHOD OF OPERATION

(71) Applicant: Performance Designed Products LLC, Burbank, CA (US)

(72) Inventors: John M. Alpay, San Juan Capistrano, CA (US); David Richard Evans, Coronado, CA (US)

(73) Assignee: Performance Designed Products LLC, Burbank, CA (US)

( * ) Notice: Subject to any disclaimer, the term of this patent is extended or adjusted under 35 U.S.C. 154(b) by 0 days.

(21) Appl. No.: 15/806,754

(22) Filed: Nov. 8, 2017

(65) Prior Publication Data

US 2018/0065034 A1    Mar. 8, 2018

Related U.S. Application Data

(63) Continuation-in-part of application No. 15/585,538, filed on May 3, 2017.

(Continued)

(51) Int. Cl.
*A63F 13/219* (2014.01)
*A63F 13/245* (2014.01)
(Continued)

(52) U.S. Cl.
CPC .......... *A63F 13/219* (2014.09); *A63F 13/213* (2014.09); *A63F 13/235* (2014.09);
(Continued)

(58) Field of Classification Search
CPC ...... A63F 13/08; A63F 13/213; A63F 13/219; A63F 13/837; A63F 2300/1087; A63F 2300/8076
See application file for complete search history.

(56) References Cited

U.S. PATENT DOCUMENTS 5,366,229 A    11/1994  Suzuki
6,902,483 B2 *  6/2005  Lin ........................ A63F 13/04
                                                         273/148 B
(Continued)

FOREIGN PATENT DOCUMENTS

EP         1380325 A1    1/2004
JP    2003-053025 A      2/2003
(Continued)

OTHER PUBLICATIONS

Communication Relating to the Results of the Partial International Search and Provisional Opinion, PCT Application PCT/US2017/030531, dated Aug. 28, 2017, 10 pp.

(Continued)

*Primary Examiner* — Steven J Hylinski
(74) *Attorney, Agent, or Firm* — Knobbe, Martens, Olson & Bear LLP

(57) ABSTRACT

A video game system can include a console, a camera and a light targeting peripheral (LTP), where the LPT can direct non-visible light (e.g., infrared (IR) light) onto a display screen. The camera is positioned so that is can view the display screen, and can locate a non-visible light dot on the display screen during video game play. The system can be used with any size or type of electronic display (e.g., any type of television, computer screen, etc.), or any type of non-electronic display (e.g., projector screen) on which the video game can be projected. The LTP has one or more sensors that sense when an accessory is attached thereto and to communicate a signal to the video game console of said attachment to adjust a parameter of the video game operated by the video game console.

17 Claims, 22 Drawing Sheets

Related U.S. Application Data

(60) Provisional application No. 62/331,252, filed on May 3, 2016, provisional application No. 62/452,688, filed on Jan. 31, 2017.

(51) Int. Cl.

| | | |
|---|---|---|
| *A63F 13/837* | (2014.01) | |
| *G02B 7/00* | (2006.01) | |
| *G02B 5/20* | (2006.01) | |
| *G06K 9/20* | (2006.01) | |
| *H04N 5/232* | (2006.01) | |
| *H04N 7/18* | (2006.01) | |
| *H04N 17/02* | (2006.01) | |
| *H04N 21/4223* | (2011.01) | |
| *A63F 13/213* | (2014.01) | |
| *A63F 13/42* | (2014.01) | |
| *A63F 13/235* | (2014.01) | |
| *G02F 1/23* | (2006.01) | |
| *H04N 17/00* | (2006.01) | |

(52) U.S. Cl.
CPC ............ *A63F 13/245* (2014.09); *A63F 13/42* (2014.09); *A63F 13/837* (2014.09); *G02B 5/208* (2013.01); *G02B 7/006* (2013.01); *G06K 9/2063* (2013.01); *H04N 5/23258* (2013.01); *H04N 5/23267* (2013.01); *H04N 7/183* (2013.01); *H04N 17/02* (2013.01); *H04N 21/4223* (2013.01); *A63F 2300/1087* (2013.01); *A63F 2300/8076* (2013.01); *G02F 1/23* (2013.01); *H04N 17/002* (2013.01)

(56) References Cited

U.S. PATENT DOCUMENTS

| | | |
|---|---|---|
| 8,169,406 B2 | 5/2012 | Barney et al. |
| 8,184,097 B1 | 5/2012 | Barney et al. |
| 2005/0143173 A1* | 6/2005 | Barney .................. A63F 13/06 463/37 |
| 2005/0230230 A1* | 10/2005 | Ueshima ................ A63F 13/06 200/18 |
| 2006/0007170 A1 | 1/2006 | Wilson |
| 2007/0177024 A1 | 8/2007 | Camhi |
| 2009/0051653 A1* | 2/2009 | Barney ................ A63F 13/428 345/158 |
| 2009/0075709 A1* | 3/2009 | Park ........................ A63F 13/10 463/2 |
| 2009/0197679 A1* | 8/2009 | Argentar ................ A63F 13/06 463/36 |
| 2011/0275435 A1* | 11/2011 | Torre ...................... A63F 13/42 463/37 |
| 2013/0084981 A1 | 4/2013 | Zalewski |
| 2013/0258116 A1 | 10/2013 | Chang |
| 2014/0220855 A1* | 8/2014 | Heilbron ............ A63H 13/005 446/175 |
| 2014/0362052 A1 | 12/2014 | Mccaughan |
| 2015/0072790 A1* | 3/2015 | Kotkin .................. A63F 13/245 463/38 |
| 2018/0064496 A1 | 3/2018 | Hladio |

FOREIGN PATENT DOCUMENTS

| | | |
|---|---|---|
| JP | 2005-046422 A | 2/2005 |
| KR | 101179218 B1 * | 9/2012 |

OTHER PUBLICATIONS

PCT Search Report/Written Opinion, PCT/US2017/030531 dated Oct. 19, 2017, Performance Designed Products LLC, 19 pp.

* cited by examiner

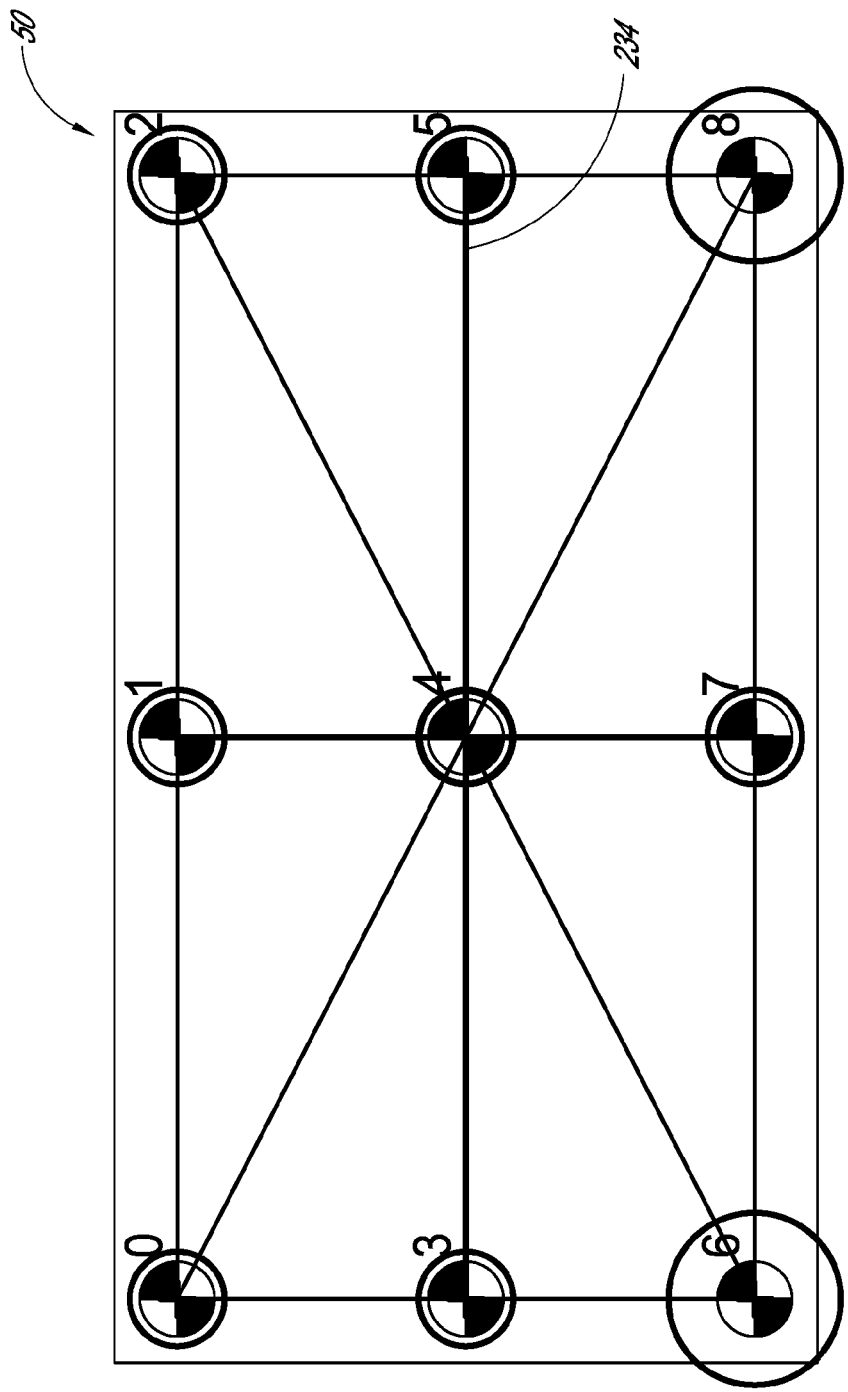

VIDEO GAMING SYSTEM AND METHOD OF OPERATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 and should be considered a part of this specification.

BACKGROUND

Field

The invention is directed to a video gaming system and method of operation, and more particularly to a video gaming system using a light targeting peripheral.

Description of the Related Art

Video games are very popular. Some games involve targeting objects in the game. When playing video games, users provide inputs to the game through a controller or peripheral.

SUMMARY

There is a need for an improved video game system.

In accordance with one aspect, a video game system can include a console, a camera and a light targeting peripheral (LTP), where the LPT can direct non-visible light (e.g., infrared (IR) light) onto a display screen. The camera can be positioned in a location that allows the camera to view the display screen, and the camera can locate the non-visible light dot on the display screen during video game play. The system can be used with any size or type of electronic display (e.g., any type of television, computer screen, etc.), any type of non-electronic display (e.g., projector screen, a wall surface) on which the video game is projected, or a display area that does not display a video game image (e.g., a poster used for calibration), where video game images are provided by a separate device (e.g., a virtual reality device, such as a head mounted display worn by the user), for example.

In accordance with another aspect, a video game system is provided. The system comprises a console configured to transmit one or more visual or aural effects of a video game to a display screen. The system also comprises a camera positionable so that it can view the display screen, the camera configured to communicate with the console. The system also comprises a light targeting peripheral comprising a trigger and a non-visible light source, the light targeting peripheral configured to direct a non-visible light onto the display screen and to communicate with one or both of the console and the camera when the trigger is actuated, the camera configured to locate a position on the display screen targeted by the light targeting peripheral upon the actuation of the trigger irrespective of a size and type of the display screen and to communicate said position to the console.

In accordance with another aspect, a video game system is provided. The system comprises a console configured to transmit one or more visual or aural effects of a video game and a camera positionable so that it can view a display, the camera configured to communicate with the console. The system also comprises a light targeting peripheral comprising a trigger and a non-visible light source, the light targeting peripheral configured to direct a non-visible light onto the display and to communicate with one or both of the console and the camera when the trigger is actuated, the camera configured to locate a position on the display targeted by the light targeting peripheral upon the actuation of the trigger irrespective of a size and type of the display screen and to communicate said position to the console.

In accordance with another aspect, a video game system is provided. The system comprises a camera positionable so that it can view a display. The camera comprises an optical filter operable to filter out visible light while allowing non-visible light to pass through a lens of the camera during operation of a video game. The system also comprises a light targeting peripheral comprising a trigger and a non-visible light source, the light targeting peripheral configured to direct a non-visible light onto the display and to communicate with the camera when the trigger is actuated, the camera configured to locate a position on the display targeted by the light targeting peripheral upon the actuation of the trigger irrespective of a size and type of the display.

In accordance with another aspect, a video game system is provided. The system comprises a camera positionable so that it can view a display, the camera configured to communicate with a video game console. The system also comprises a light targeting peripheral configured to communicate with one or both of the camera and the video game console. The light targeting peripheral comprises a housing, a non-visible light source at least partially disposed in the housing, and a trigger actuatable by a user relative to the housing to actuate the non-visible light source. The light targeting peripheral further comprises a switch disposed at least partially in the housing and in communication with the trigger and configured to generate a trigger signal when the trigger is depressed by the user, and circuitry housed in the housing and electrically connected to the switch and configured to receive the trigger signal from the switch. The light targeting peripheral further comprises one or more sensors disposed on or in the housing and configured to sense when an accessory is coupled to the housing and to communicate an accessory signal indicative of said accessory coupling to the circuitry. The light targeting peripheral also comprises a communication module housed in the housing and configured to communicate with the circuitry and with the video game console. The circuitry is configured to transmit a first signal to the video game console via the communication module corresponding to the trigger signal, the circuitry further configured to transmit a second signal to the video game console via the communication module corresponding to the accessory signal to adjust an operating parameter of a video game operated by the video game console.

In accordance with another aspect, a light targeting peripheral for use with a video game console to play a video game is provided. The light targeting peripheral comprises a housing, a non-visible light source at least partially disposed in the housing, and a trigger actuatable by a user relative to the housing to actuate the non-visible light source. The light targeting peripheral further comprises a switch disposed at least partially in the housing and in communication with the trigger and configured to generate a trigger signal when the trigger is depressed by the user, and circuitry housed in the housing and electrically connected to the switch and configured to receive the trigger signal from the switch. The light targeting peripheral further comprises one or more sensors disposed on or in the housing and configured to sense when an accessory is coupled to the housing and to communicate an accessory signal indicative of said accessory coupling to the circuitry. The light targeting peripheral also comprises a communication module housed in the housing and configured to communicate with the circuitry and with the video game console. The circuitry is configured to transmit a first signal to the video game console via the communication module corresponding to the trigger signal, the circuitry further configured to transmit a second signal to the video game console via the communication module corresponding to the accessory signal to adjust an operating parameter of a video game operated by the video game console.

BRIEF DESCRIPTION OF THE DRAWINGS

FIG. 3C shows a calibration step in the method of FIG. 3.

DETAILED DESCRIPTION

Figure 1:
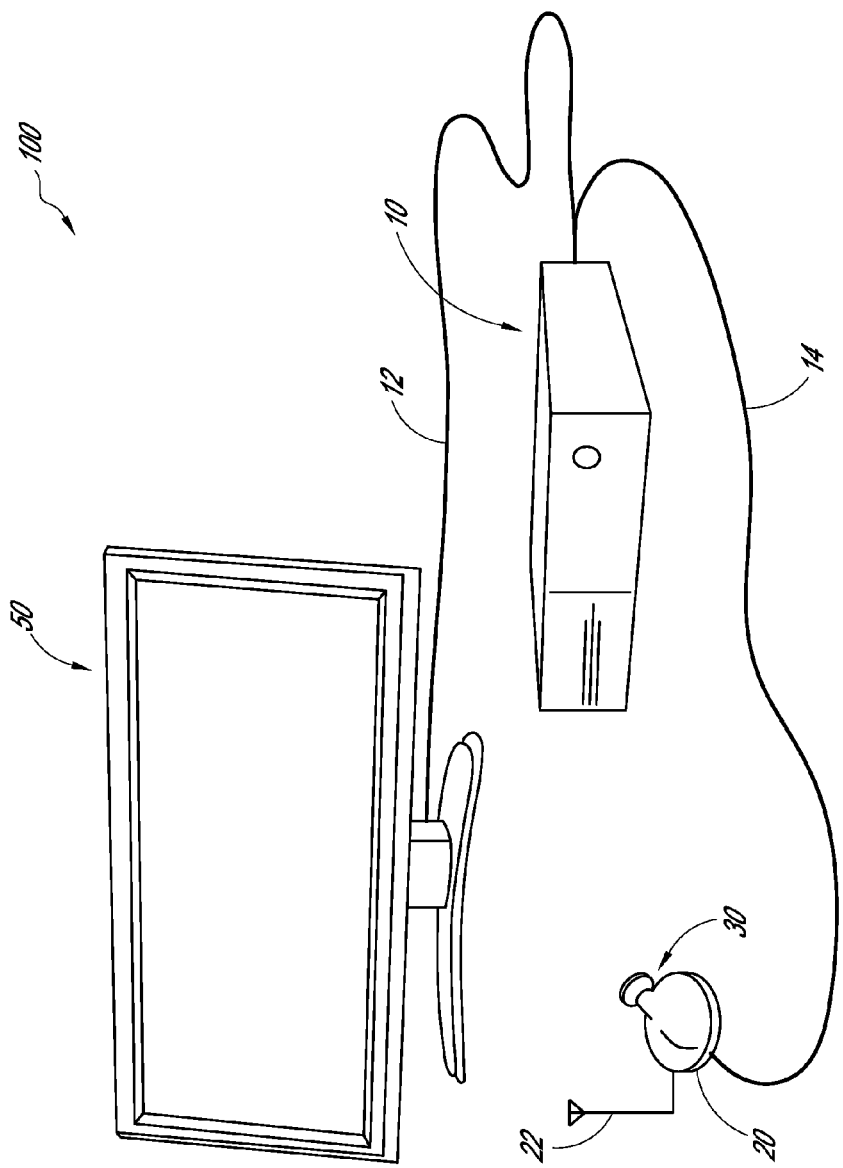
FIG. 1 is a schematic drawing of one embodiment of a video gaming system.
Figure 1:
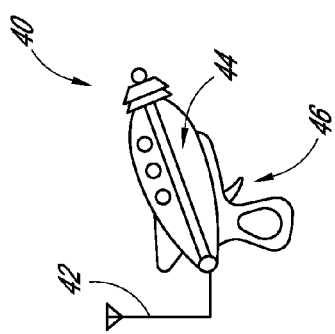

FIG. 1 shows one embodiment of a video gaming system 100. The system 100 can include a console 10, a light locating camera 20 that utilizes an optical filter 30, and a light targeting peripheral (LTP) 40 (e.g., a light gun). Advantageously, the system 100 can be used with any size or type of display screen, including any type of television (e.g., LCD, LED, CRT, Plasma, etc.), computer monitor, display area (e.g., a projector screen, a wall area) that can display a video game image (e.g., projected onto the display area by a projector), or a display area that does not display a video game image (e.g., a poster used for calibration), where video game images are provided by a separate device (e.g., a virtual reality device, such as a head mounted display worn by the user), for example.

The LTP 40 can direct non-visible light (e.g., an infrared (IR) light, ultraviolet (UV) light, etc.) onto a display screen 50, and the location of the light on the display screen 50 can be located by the camera 20, as discussed in more detail below. The console 10 can communicate with the display screen 50 (e.g., via a cable 12), and the camera 20 can communicate with the console 10 (e.g., via a cable 14). The console 10 can operate the video game and communicate with the display screen 50 to display images from the video game and provide audio effects associated with the video game. In some embodiments, one or more of the console 10, camera 20 and LTP 40 can communicate wirelessly (e.g., via an RF link).

In the illustrated embodiment, the LTP 40 can communicate wirelessly with the camera 20, such as via an RF link. In another embodiment, the LTP 40 can additionally, or alternatively, communicates with the console 10. For example, if the image processing is at least partially performed by software in the console 10, the LTP 40 can communicate with the console 10. The LTP 40 can have a wireless transmitter 42 to transmit data to one or both of the console 10 and the camera 20, which can have a wireless receiver 22, as discussed further below. Optionally, the LTP 40 can also have a wireless receiver to receive data from one or both of the console 10 and the camera 20. In still another embodiment, the LTP 40 can communicate with one or both of the camera 20 and console 10 via a cable. The LTP 40 can have a light source 44, which in one embodiment can be an infrared laser, where the IR laser can have optics to collimate and focus the laser so that the laser is straight, and where the size of the IR light dot from the laser has the same size regardless of the distance of the LTP 40 from the display screen 50. In another embodiment, the LTP 40 can have an infrared LED as the light source 44, with optics to focus the IR light from the LED. The size of the IR light dot will vary with the distance of the LTP 40 is from the display screen 50 (e.g., the IR light dot will be larger the farther the LTP 40 is from the display screen 50). However, in other embodiments, the light source 44 of the LTP 40 can use other forms of non-visible light (e.g., ultraviolet light).

The LTP 40 can optionally be customizable. In one embodiment, the LTP 40 can be a passive device and include a non-visible light emitter (e.g., an IR light emitter) as the light source 44 and a trigger 46. In one embodiment, actuation of the trigger 46 can break or switch off the non-visible light that is otherwise continuously emitted. In another embodiment, actuation of the trigger 46 does not break or switch off the non-visible light but communicates with the camera 20 and/or console 10 when the trigger 46 is actuated. In still another embodiment, the actuation of the trigger 46 can turn on the non-visible light momentarily, where the non-visible light is otherwise switched off, as described further below. If the LTP 40 is a wireless device, it can also include one or more batteries (not shown) and the wireless transmitter 42. Where the LTP 40 is a passive device, it does not receive any data from the camera 20.

In another embodiment, the LTP 40 can be an active device. In this embodiment, in addition to having the features described above for a passive device, the LTP 40 can include a receiver (e.g. wireless receiver) and circuitry (e.g., integrated circuit or IC) that allows it to have additional functionality. For example, the LTP 40 can receive data from the camera 20 that allows it to control aspects of the video game itself.

In another embodiment, the LTP 40 can include additional control inputs in addition to the trigger 46 that allow the LTP 40 to provide additional inputs to the video game, such as when the LTP 40 is an active device as described above. For example, the LTP 40 can include one or more of a D-pad, one or more input buttons, and an analog joystick.

In another embodiment, the LTP 40 can have one or more sensors, such as accelerometers, magnetometers, gyroscopes, that can be used in inertial tracking of the LTP 40 by tracking software of the system 100. Said inertial tracking can facilitate the determination of the location of the non-visible light dot when the trigger is actuated (e.g., where the non-visible light is continually emitted and therefore continually tracked by the tracking software) by providing the tracking software with additional information about the direction of movement and/or orientation of the LTP 40 before the trigger 46 was actuated.

In another embodiment, the LTP 40 can have one or more expansion ports that can receive a controller to provide additional control in the video game. In such an embodiment, the LTP 40 can operate in tandem with the controller to provide a user with the ability to control more aspects of the video game than if the controller was not coupled to the LTP 40.

The camera 20 can be positioned in any location that allows it to view or "look" at the display screen 50 (e.g., at a location below, above, to the left of, to the right of, close to, or far from the display screen 50). Moreover, the camera 20 can be supported on any suitable surface, such as the floor, on a table, a counter, etc. The camera 20 can be mounted in any suitable manner. In one embodiment, the camera 20 can have a clamp that allows it to mount, for example, to a table (e.g., coffee table) or chair. In another embodiment, the camera 20 can have vacuum mount system (e.g., one or more vacuum cups or suction cups) that can removably mount the camera 20 to a support surface (such as a table surface, floor, etc.) to generally fix the location of the camera 20. In still another embodiment, the camera 20 can have one or more pads (friction pads) on a bottom surface of the camera 20 to generally fix the location of the camera 20. In one embodiment, the camera 20 can have a low profile that inhibits unintended movement of the camera 20, for example, when bumped by a user. Optionally, the camera 20 can be dome shaped. In one embodiment, the camera 20 can have an accelerometer or other type of orientation sensor (e.g., magnetometer) that can provide information on the orientation of the camera 20, which can be used by the software (e.g., calibration software or tracking software, as described further below) to ensure that the location of a non-visible light when the trigger 46 is actuated is correctly translated onto the display screen 50.

Figure 2A:
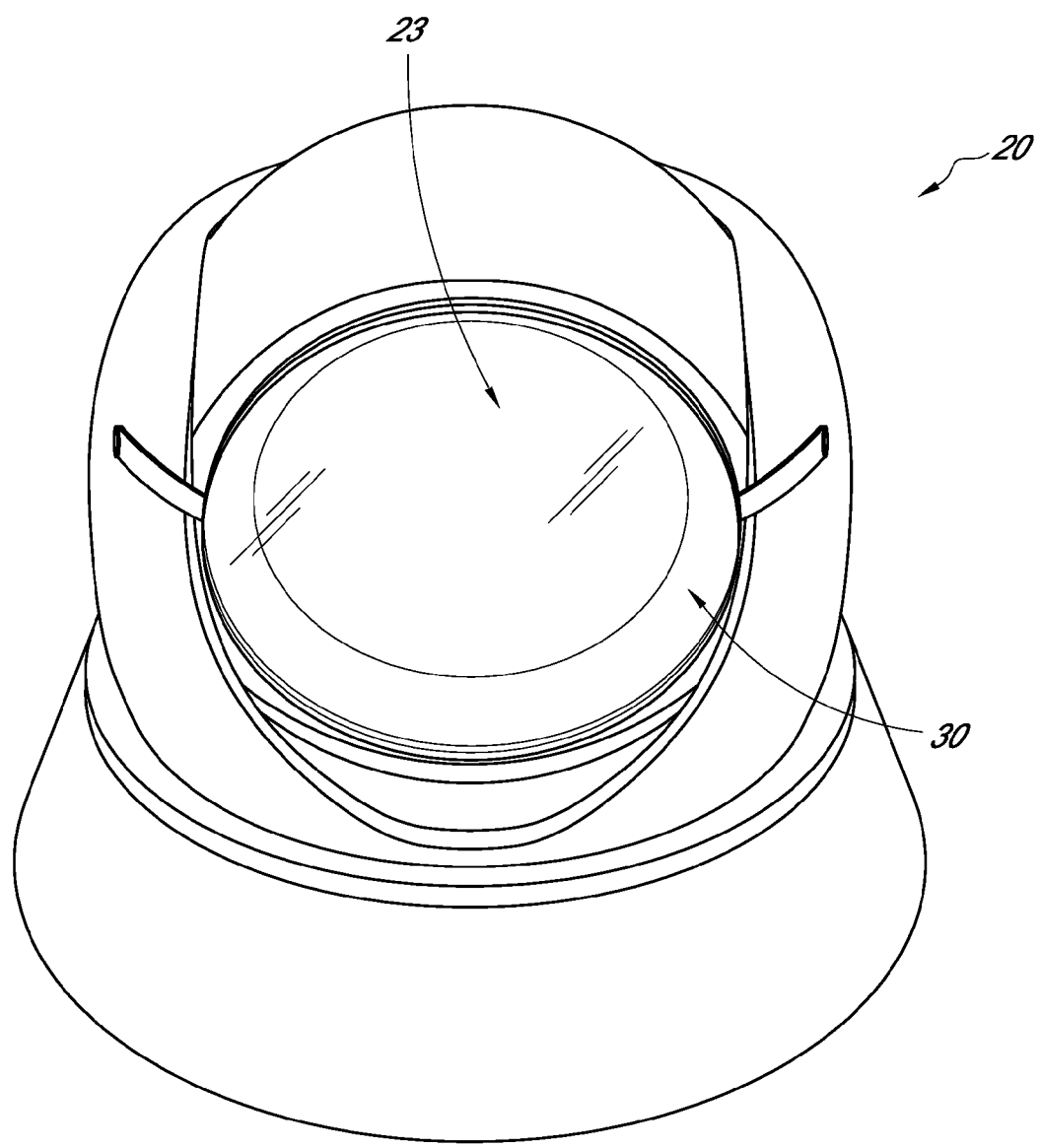
FIG. 2A shows one embodiment of a camera for the system in FIG. 1, with an optical filter positioned in front of the lens to filter out visible light and allow non-visible light to pass into the camera lens.
Figure 2B:
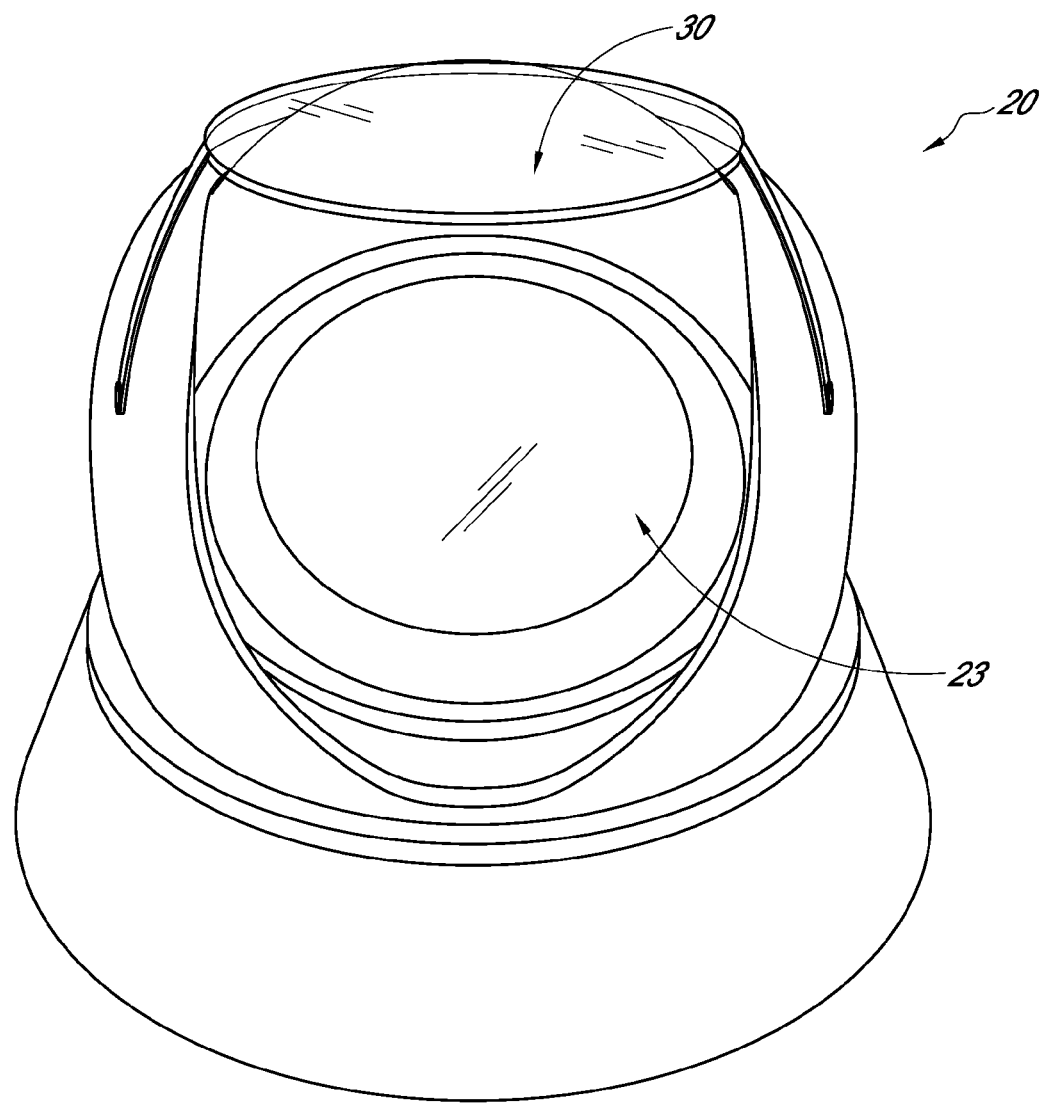
FIG. 2B shows the camera of FIG. 2A, with an optical filter positioned out of the way to allow visible light into the camera lens.

With continued reference to FIG. 1, the camera 20 can have an optical filter 30 that filters out visible light but allows the camera 20 to view non-visible light, such as a low-pass IR optical filter, where the filter 30 is selectively applied to filter out visible light. In one embodiment, the optical filter 30 can resemble a piece of black plastic. FIG. 2A shows an embodiment of the camera 20 with the optical filter 30 positioned in front of the lens 23 of the camera 20 to filter out visible light while allowing non-visible light (e.g., IR light) to pass through the lens 23 of the camera 20. FIG. 2B shows the camera 20 of FIG. 2A, where the optical filter 30 is positioned out of the way of the lens 23 to allow visible light to pass through the lens 23 of the camera 20.

In one embodiment, the filter 30 is a switchable or removable filter 30 that can be selectively positioned in front of the lens 23 of the camera 20. For example, in one embodiment, the optical filter 30 can be positioned mechanically in front of the lens 23 of the camera 20 and moved out of the way from in front of the lens 23 of the camera 20, such as with a stepper motor. However, other suitable mechanisms can be used to position the optical filter 30 in front of the lens 23 of the camera 20 as well as move it out of the way of the lens 23 of the camera 20, such as a sliding mechanism. In still another embodiment, the optical filter 30 can be manually positioned in front of the lens 23 of the camera 20 (e.g., by a user) as well as removed from in front of the lens 23. In another embodiment, the camera 20 can have an electronically switchable optical filter (e.g., night mode), as opposed to a physical optical filter, that can be selectively operated to filter out visible light while allowing non-visible light (e.g., IR light) to pass through the lens 23 of the camera 20. In some embodiments, the camera 20 can be a wide bandwidth camera, where the IR blocking filter has been removed so that the camera 20 can view IR through visible light. In one embodiment, the camera 20 is a Raspberry Pi Noir IR camera.

Figure 2C:
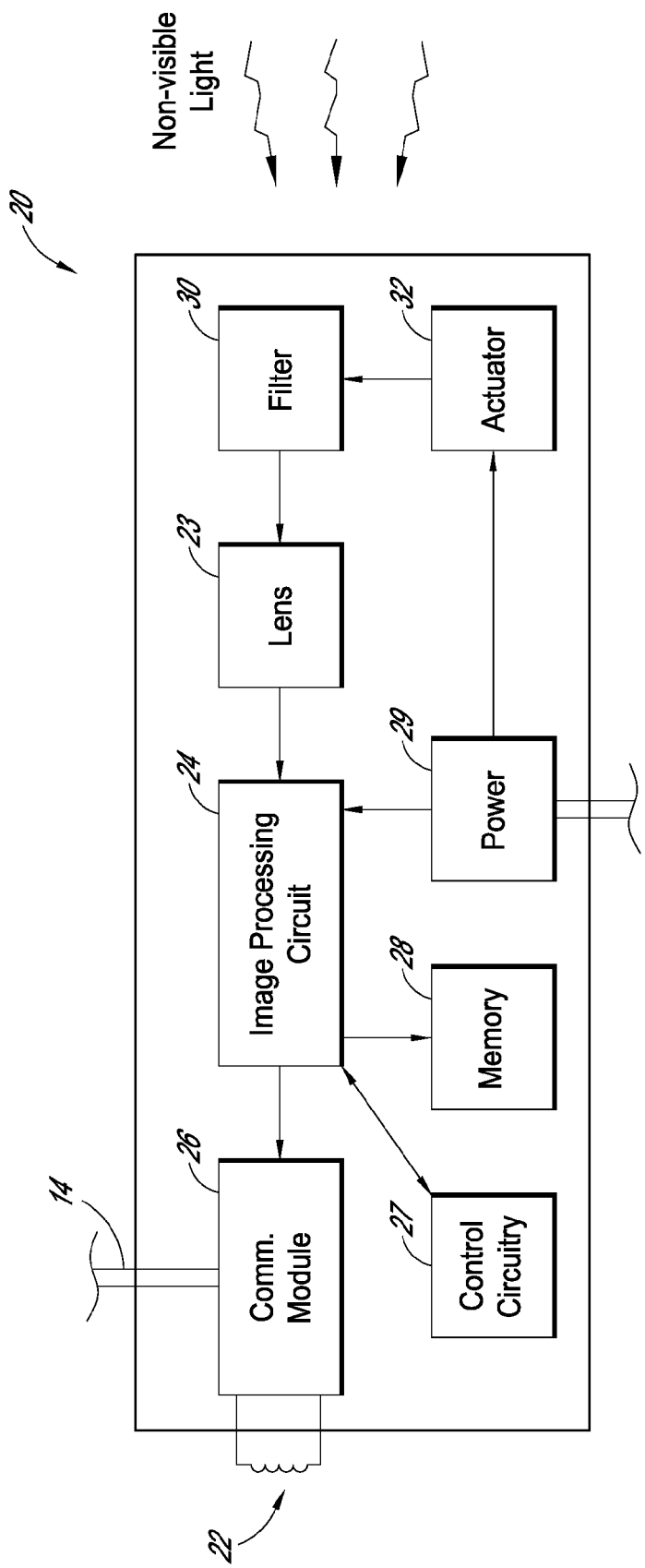
FIG. 2C shows a schematic view of the electronics of the camera of FIG. 1.

FIG. 2C shows one embodiment of an electronics diagram for the camera 20. The camera 20 can include an optical filter 30 and an actuator 32 that selectively positions the filter 30 in front of the lens 23 to filter out visible light. Optionally, the light that passes through the lens 23 can be processed by an image processing circuit 24 in the camera 20. In another embodiment, the camera 20 can exclude the image processing circuit and such circuit can be in the console 10. The camera 20 can also include a communication module, which can be connected to the wireless receiver 22 and the cable 14 that connects the camera 20 to the console 10. The camera 20 can also have control circuitry 27 for controlling the operation of the camera 20, which can optionally include one or more sensors (e.g., accelerometer, magnetometer) and a memory 28. In one embodiment, the camera 20 received power from an outside source via a power module 29 and cable. In another embodiment, the camera 20 can be powered by one or more batteries (not shown).

Calibration

Figure 3:
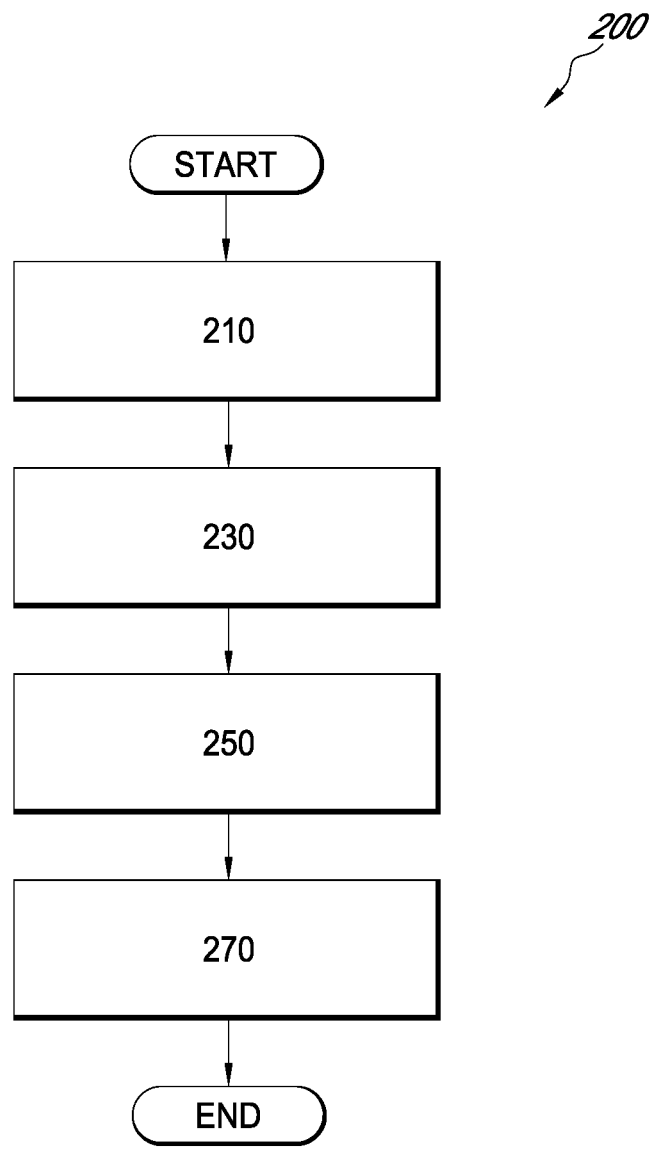
FIG. 3 shows a flowchart for one method of calibrating the camera.

Prior to use of the system 100, the position of the camera 20 is calibrated relative to the display screen 50. FIG. 3 shows a flowchart of a calibration method 200 for the camera 20. The optical filter 30 is removed 210 from the camera 20 (or the optical filter is switched off where the camera 20 has an electronically switchable optical filter) so that the camera 20 can see visible light. A calibration image is displayed 230 on the display screen 50 (e.g., by the console 10). Image recognition software processes 250 the visible light video feed (e.g., continually reads the video output) from the camera 20 to find the calibration image. In one embodiment, the image processing is at least partially performed by the camera 20 (via the image processing circuit 24, as described above). In another embodiment, the image processing is at least partially performed by the console 10. Once the calibration image is found by the software, the software calculates 270 camera coordinates that represent the corners of the display screen 50 in the field of view of the camera 20, at which point the calibration of the camera 20 is completed. In some embodiments, where the camera 20 has an extra wide-angle lens that distorts the image and where the display screen 50 appears curved, the image recognition software utilizes additional algorithms to undistort the image.

With respect to step 230, various different images can be used in the calibration method 200. In one embodiment, the calibration image can be a QR code. In another embodiment, the calibration image can be a plain screen image that cycles through a known sequence of colors on the display screen 50 (e.g., all red, all blue, all green, etc.), where the image recognition software can process the image and look for pixels in the live feed from the camera 20 that mimics the sequence of the calibration image.

Figure 3A:
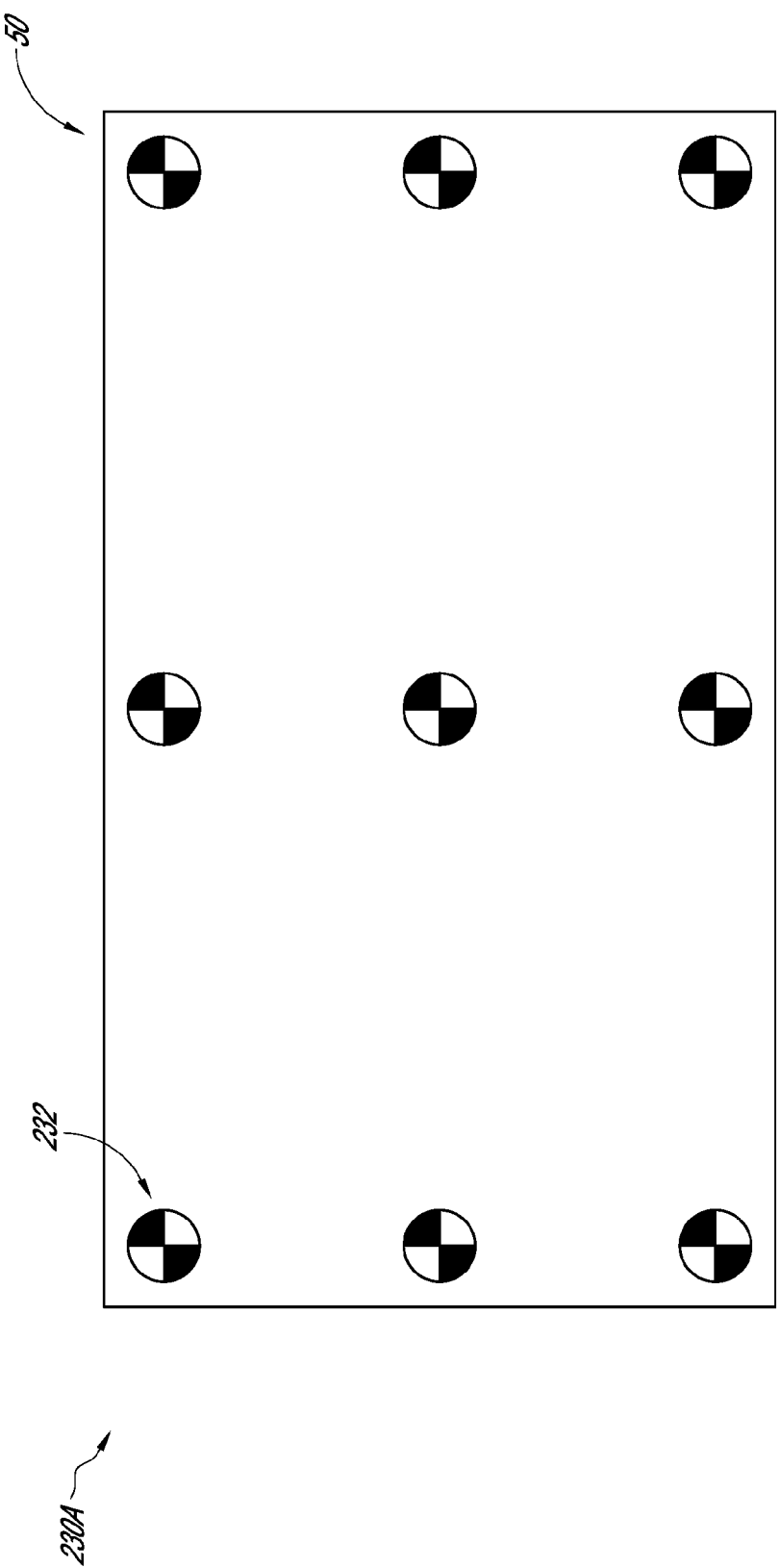
FIG. 3A shows one embodiment of a calibration image.

FIG. 3A shows one embodiment of a calibration image 230A that can be used in step 230 of the calibration method 200, where the calibration image 230A includes nine markers 232 that are displayed on the display screen 50. The image recognition software can process 250 the calibration image using a Harris Corner Detection algorithm. In another embodiment, the image recognition software can process 250 the calibration image using other suitable algorithms, such as a Features from Accelerated Segment Test (FAST) algorithm. Further details on the FAST algorithm can be found in the following articles, all of which are incorporated by reference: Edward Rosten et al., *Fusing Points and Lines for High Performance Tracking*, IEEE International Conference on Computer Vision, October 2005; Edward Rosten et al., *Machine Learning for High-speed Corner Detection*, European Conference on Computer Vision, May 2006; and Edward Rosten et al., *FASTER and Better: A Machine Learning Approach to Corner Detection*, IEEE Trans. Pattern Analysis and Machine Intelligence, 2010.

The Harris Corner Detection algorithm returns a numerical value for each pixel in the camera image representative of a likelihood of the pixel being in a corner in the image. The algorithm filters out any pixel below a threshold value and generates a list of points (x, y coordinates) within the camera image that represent potential corners. The list of points is processed and grouped into clusters. For example, each point is processed to determine if it is within a distance threshold from any other point previously processed within an existing cluster; if the point is within the threshold it is added to the cluster. If said point is not within the threshold from another point, a new cluster is started with said point. This process is repeated until all points are processed. The center of each cluster is then calculated, which can be defined as the average coordinate of all the points in the cluster, and the radius of each cluster is also calculated, which is the furthest distance any of the points in the cluster is from the center of the cluster. Clusters having less than a predetermined number of points (e.g., less than 2 points) are rejected or filtered out.

Figure 3B:
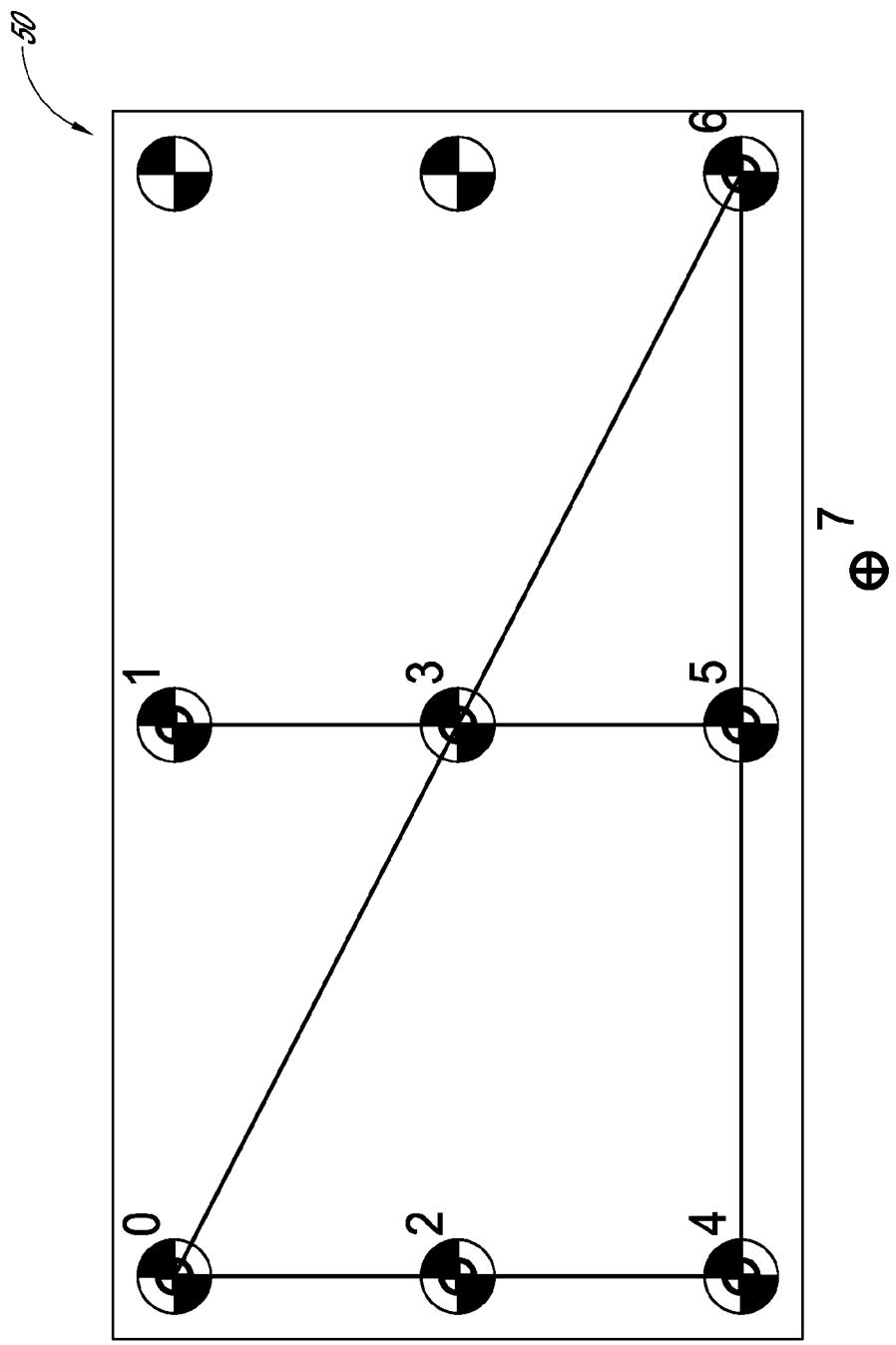
FIG. 3B shows a calibration step in the method of FIG. 3.

FIG. 3B shows a sub-step 230B of the processing step 250 of the calibration process 200 with the calibration image on the display screen 50, where all the detected clusters are represented by a circle and an identification number. As shown in FIG. 3B, the software has detected most of the reference marks, but there may be a few that are misidentified (e.g., no. 7 in FIG. 3B).

FIG. 3C shows a sub-step 230C of the processing step 250 in the calibration process 200 with the calibration image on the display screen 50. The image recognition software determines if the clusters represent a screen by using the known relationship of the reference marks in the calibration image to each other. Each cluster in the list of clusters is evaluated as an "assumed" center point of the display screen 50 by determining if it meets the following set of rules. The image recognition software looks for pairs of clusters that can be connected by a line 234 that passes in close proximity to the center point of the "assumed" center point, and where the end points of such a line are approximately at the center of another line defined by another pair of clusters. In FIG. 3C, the line from cluster 1 to cluster 7 passes through the "assumed" center point (at cluster 4) and the ends of said line are approximately at the center of the lines that connect clusters 0 to 2 and clusters 6 to 8. Similarly, the line 234 that passes from cluster 3 to 5 passes through the "assumed" center point (at cluster 4) and the ends of said line are approximately at the center of the lines that connect clusters 2 to 8 and that connect clusters 0 to 6. The end point lines are evaluated to ensure they form a closed rectangle around the center point, and diagonal lines from the intersection of the four end point lines are evaluated to confirm the lines pass through the "assumed" center point. Additionally, angles between the four lines (e.g., between the line from cluster 0 to 2, and line from cluster 2 to 8) are evaluated to determine if the angle meets a threshold value (e.g. around 75 degrees). Because the camera 20 may be askew to the display screen 50, the angle between the lines may not be approximately 90 degrees. Once the image recognition software has confirmed the "assumed" center point of the display screen 50 is the center point of the display screen 50, the software determines 270 the coordinates of the four corners of the display screen 50 within the field of view of the camera 20 and the calibration is complete (e.g., P1-P4 in FIG. 5B).

In another embodiment of the calibration method 200, the calibration image, such as the calibration image 230A in FIG. 3A, can be flashed on in one frame on the display screen 50 (e.g., by the console 10) and turned off in the next frame on the display screen 50. For example, in one embodiment the calibration image 230A can be flashed on for 100 ms and turned off for 100 ms. However, in other embodiments, the time the calibration image 230A is on and off can vary (e.g., can be about 150 ms). In the illustrated embodiment, the calibration image 230A has nine markers. However, in other embodiments the calibration image 230A can have a different number of markers (e.g., fewer markers, more markers). In one embodiment, the calibration image 230A can have only four markers at the corners.

Image recognition software can process 250 the feed from the camera 20 frame by frame and perform frame subtraction to identify the changes in what is shown in the display screen 50 (e.g., identify changes on the display screen when the calibration image 230A is turned on and off). In one embodiment, the camera 20 can operate at about 90 frames per second; however, in other embodiments, the camera 20 can operate at a larger or smaller number of frames per second. Where the flashed frames of the calibration image 23A are not synchronized with the camera frames, the image processing software can use an algorithm, including an accumulator or counter, to account for the calibration image flashing at a slower rate than the camera operation, in order to perform the frame subtraction step and identify the calibration image. In one embodiment, the software compares a camera frame with a previous frame (e.g., a frame from 10-15 previous frames) that is not the immediately previous frame. In another embodiment, the software compares a camera frame with the immediately previous frame.

Figure 3D:
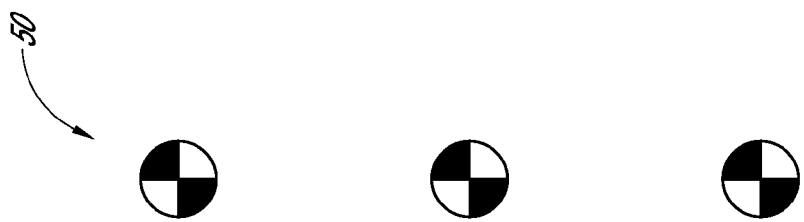
FIG. 3D shows another embodiment of a calibration step in the method of FIG. 3.
Figure 3D:
Figure 3D:
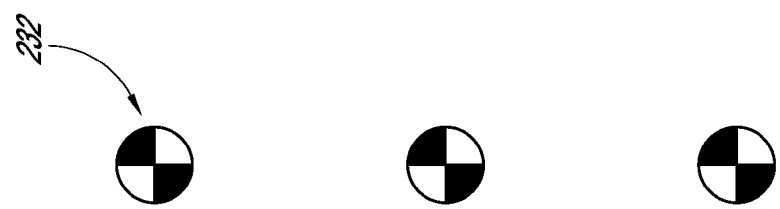
Figure 3E:
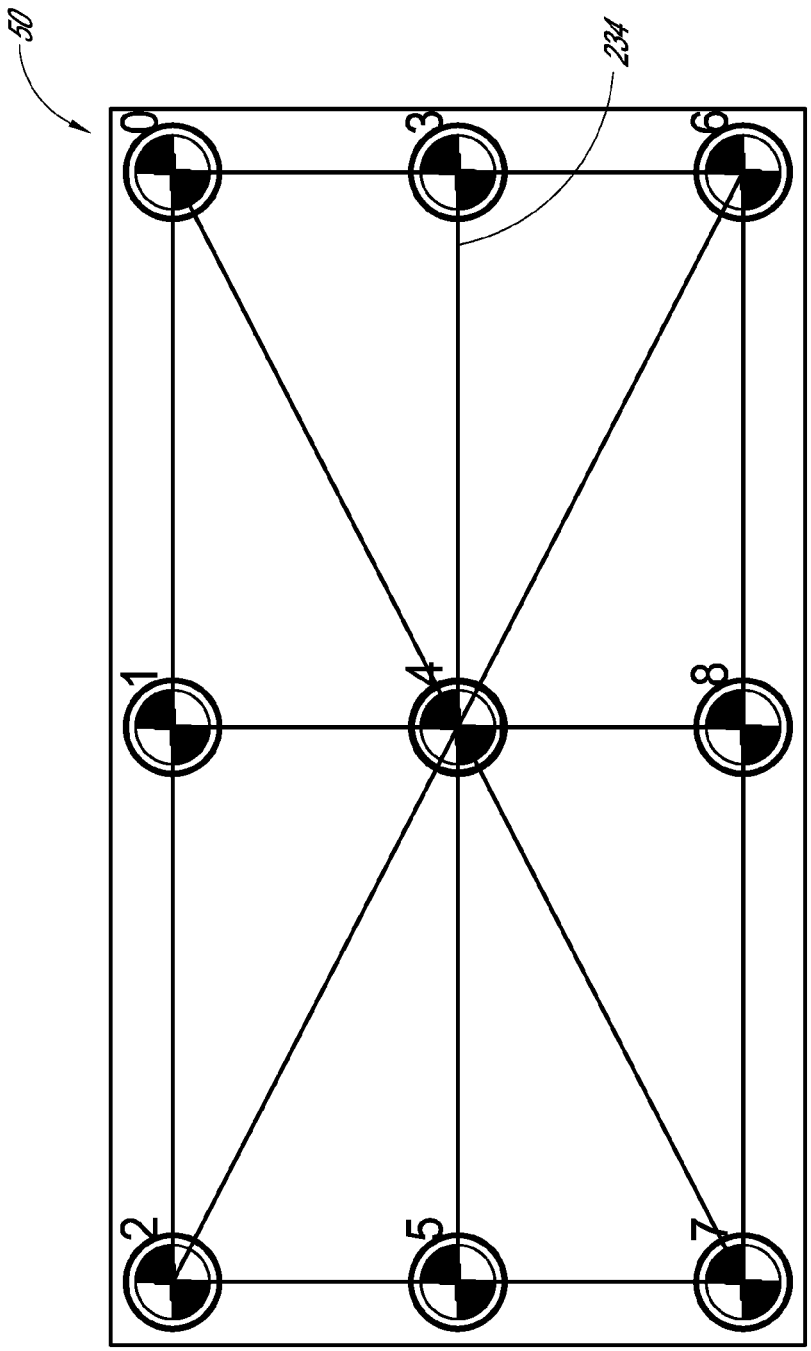
FIG. 3E shows another embodiment of a calibration step in the method of FIG. 3.

Due to the flashing of the calibration image 230A on the display screen 50, the frame subtraction process results in the background detail being removed (e.g., background detail that may be interpreted as false corners) and leaving only the calibration markers in a black screen (not shown), as shown in FIG. 3D. In some embodiments, the image calibration software can look for the flashing calibration image over a number of frames to identify the markers in the calibration image as reliable markers. The image recognition software can then associate the markers with the corners of the screen and the software determines 270 the coordinates of the four corners on the display screen 50 within the field of view of the camera 20 (e.g., connects the markers with lines to define the corners of the display screen 50 within the field of view of the camera 20), as shown in FIG. 3E. The flashing of the calibration image and use of frame subtraction can advantageously simplify and speed-up the calibration process.

In one embodiment, the calibration method 200 can be performed every time the system 100 is turned on, prior to the user playing a game. In another embodiment, the calibration method 200 can be performed at a predetermined time (e.g., once a day, once every other day, once every week, etc.).

Recalibration

Figure 4:
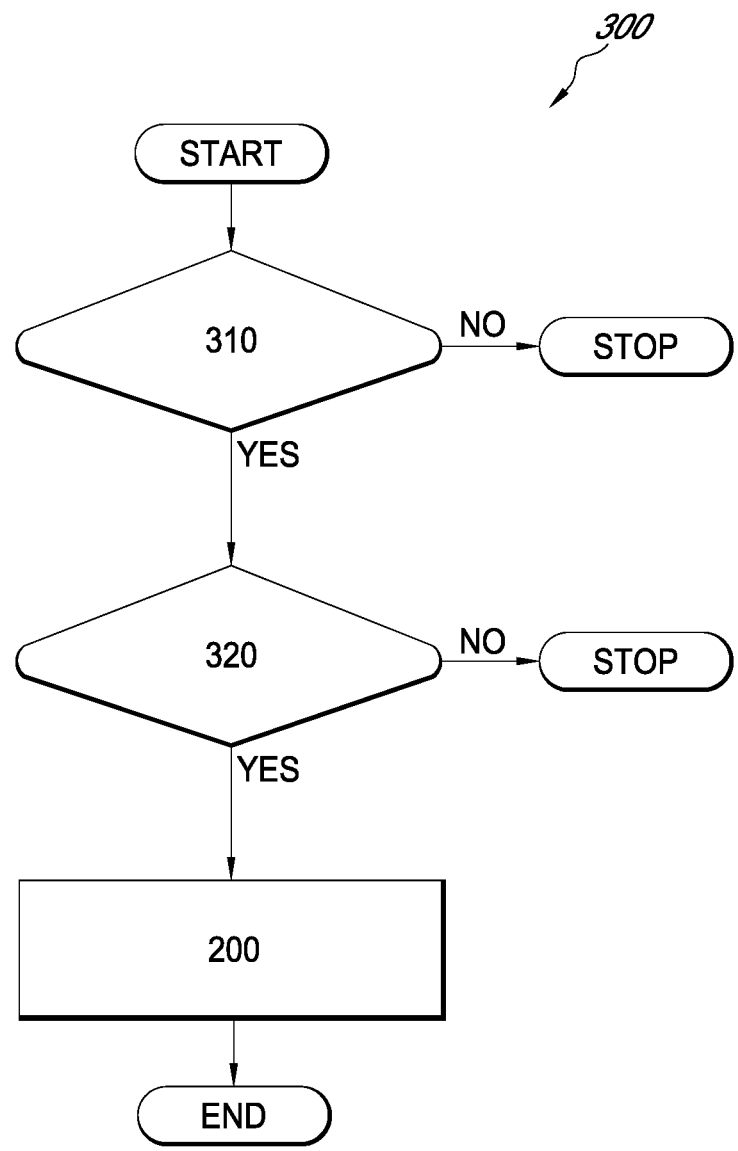
FIG. 4 shows a flowchart for one method of recalibrating the camera.

FIG. 4 shows one embodiment of a recalibration method 300, which can be performed after the calibration method 200 has been completed (e.g., while in play mode, discussed further below). If the camera 20 position moves (e.g., as a result of a player bumping into the camera), the camera 20 can be recalibrated relative to the display screen 50. With continued reference to FIG. 4, if motion of the camera 20 is sensed 310 (e.g., with one or more sensors in the camera 20, such as an accelerometer), the software determines 320 if the sensed motion is above a predetermined threshold (e.g., above a predetermined force magnitude). In one embodiment, the one or more sensors in the camera 20 that sense whether the camera 20 has been moved can be the same sensors used to determine the orientation of the camera 20, as discussed above; in another embodiment, the sensors that sense movement of the camera 20 to determine if recalibration should be performed can be separate from the one or more sensors that sense the orientation of the camera 20. If the sensed movement is above the threshold, then the calibration method 200 is performed again (see FIG. 3). In one embodiment, if the sensed motion is above the predetermined threshold, the system 100 may automatically being the recalibration of the camera 20. In another embodiment, the system 100 can provide feedback to the user (e.g., visual and/or audio feedback) that the camera 20 needs to be recalibrated, at which point the video game is paused and the camera 20 is recalibrated. If the sensed motion 310 is not above the threshold, the software determines that recalibration is not needed.

Play Mode—Tracking Non-Visible Light

Figure 5:
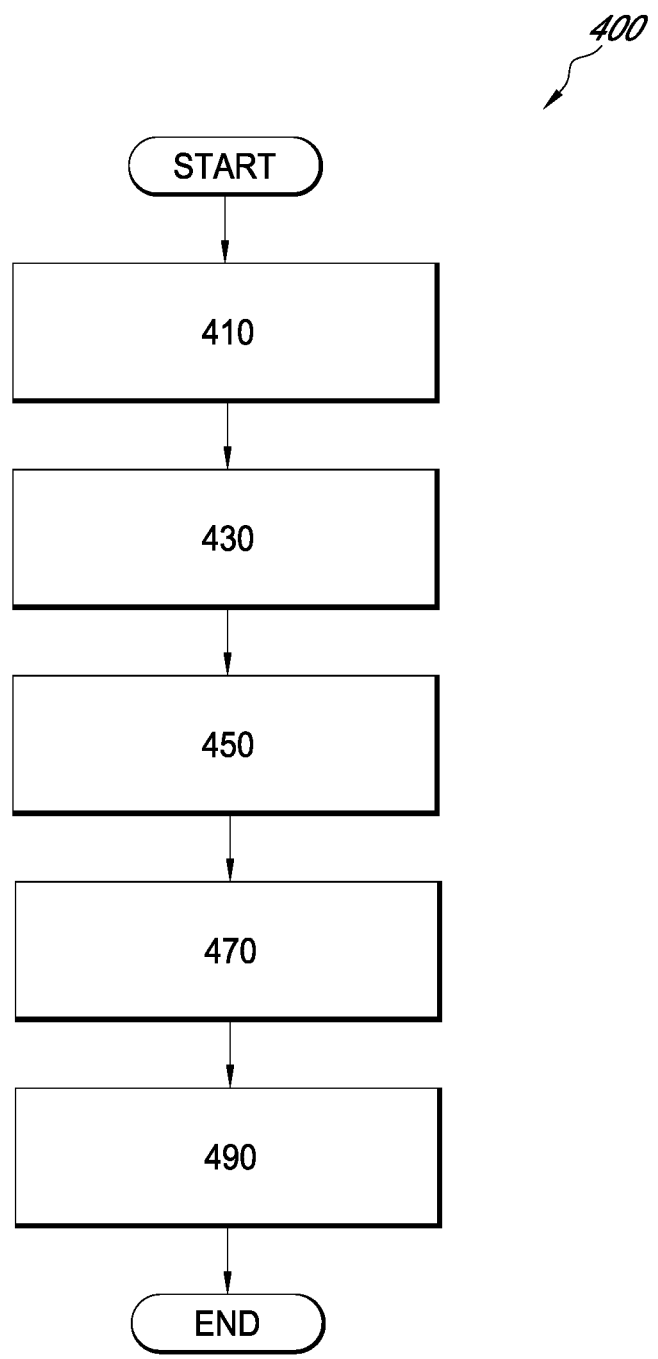
FIG. 5 shows a flowchart of one embodiment of a tracking method for the video gaming system.
Figure 5A:
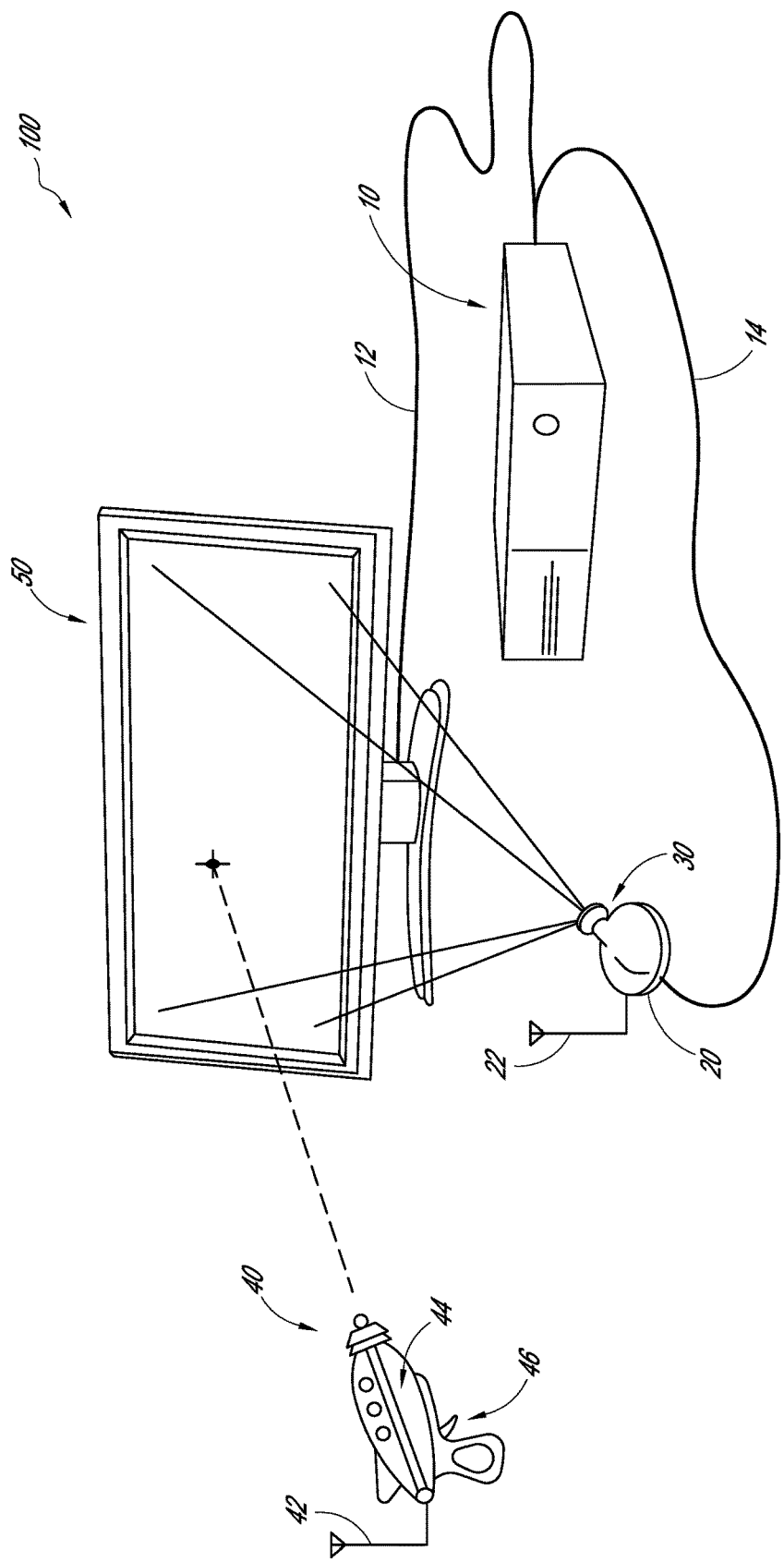
FIG. 5A shows a schematic drawing of the video gaming system in use.

FIG. 5 shows a flowchart of a method of tracking the non-visible light (e.g., IR light) from the LTP 40 when the system 100 is in play mode (shown in FIG. 5A). Once calibration of the camera 20 is completed, the optical filter (such as optical filter 30) is positioned 410 in front of the lens 23 of the camera 20 to filter out visible light while allowing non-visible light to pass through the lens 23 of the camera 20.

Figure 5B:
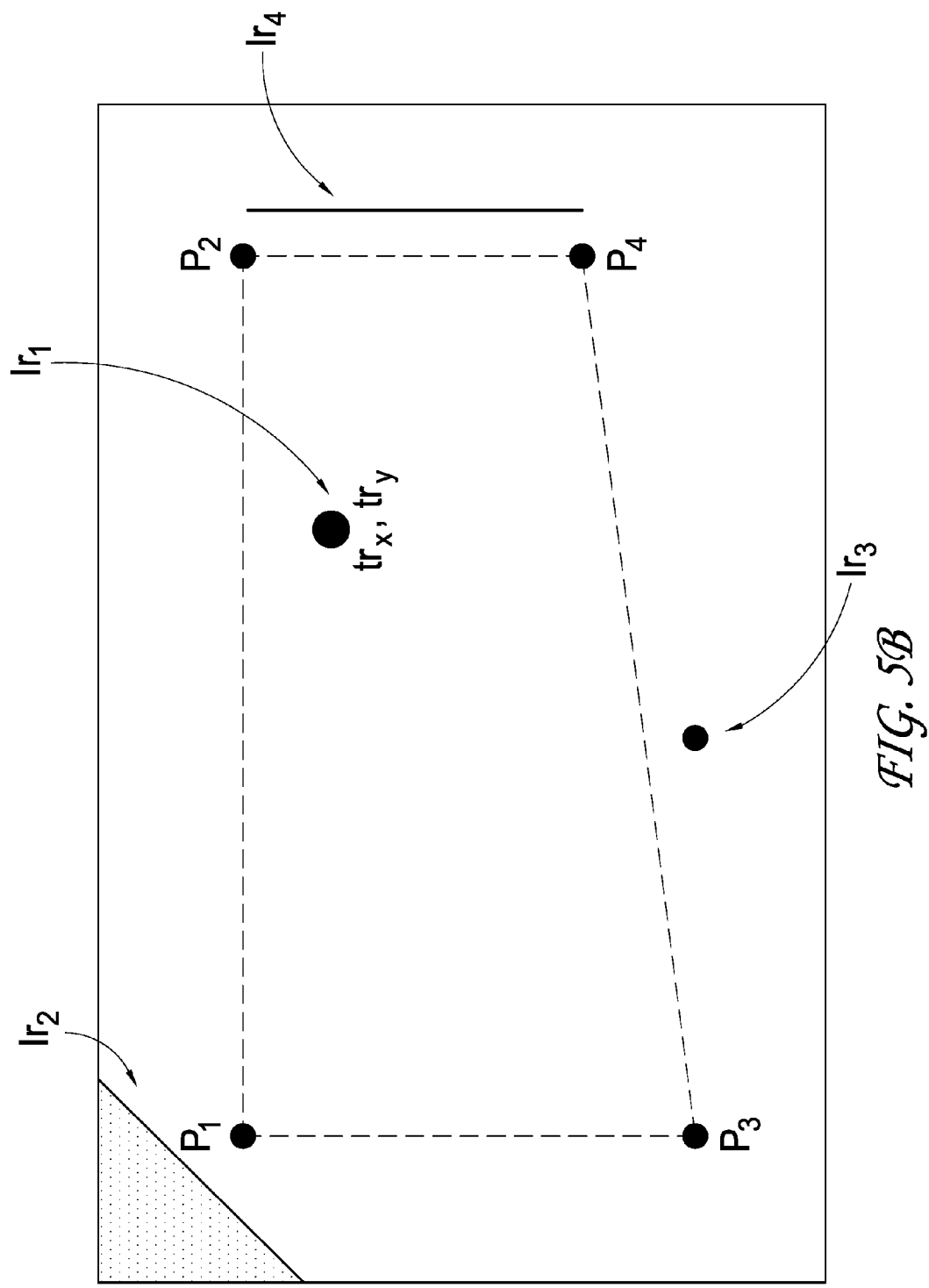
FIG. 5B shows a step in the tracking method of FIG. 5.

The tracking software searches the feed from the camera 20 for non-visible light (e.g., IR light). As shown in FIG. 5B, there may be multiple sources of non-visible light, such as background IR light on a wall IR2, IR light on an LED TV IR3, IR reflection on the display screen 50 IR4, so the software determines 430 which source is most likely to be the non-visible light IR1 from the LTP 40. In one embodiment, the software determines which source in the video feed is the non-visible light IR1 from the LTP 40 by filtering out intensity values below a predetermined threshold value (e.g., to filter out background light). In another embodiment, the software additionally, or alternatively, ignores (filters out) light sources that aren't round (or less dense, as discussed further below). For example, the software searches for a group of pixels that form a dot (e.g., generally circular shape) with the highest concentration or density of pixels, while considering the intensity values. In still another embodiment, the software ignores (filters out) light sources that are outside the quadrangle defined by the corners of the display screen (P1-P4 in FIG. 5B) that are in the field of view of the camera 20. However, other suitable techniques for identifying the non-visible light IR1 from the LTP 40 can be used.

Figure 5C:
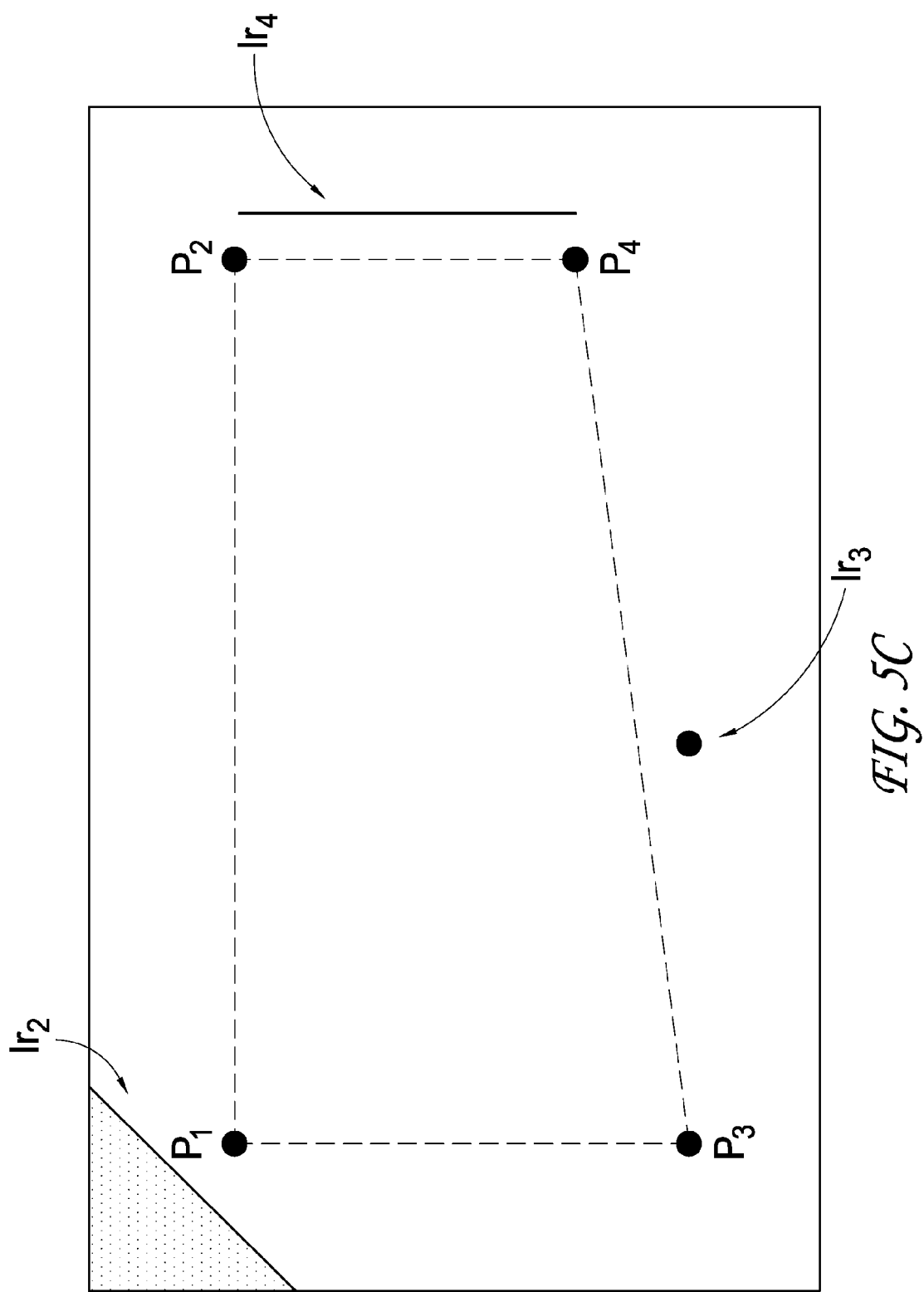
FIG. 5C shows another embodiment of a step in the tracking method of FIG. 5.
Figure 5D:
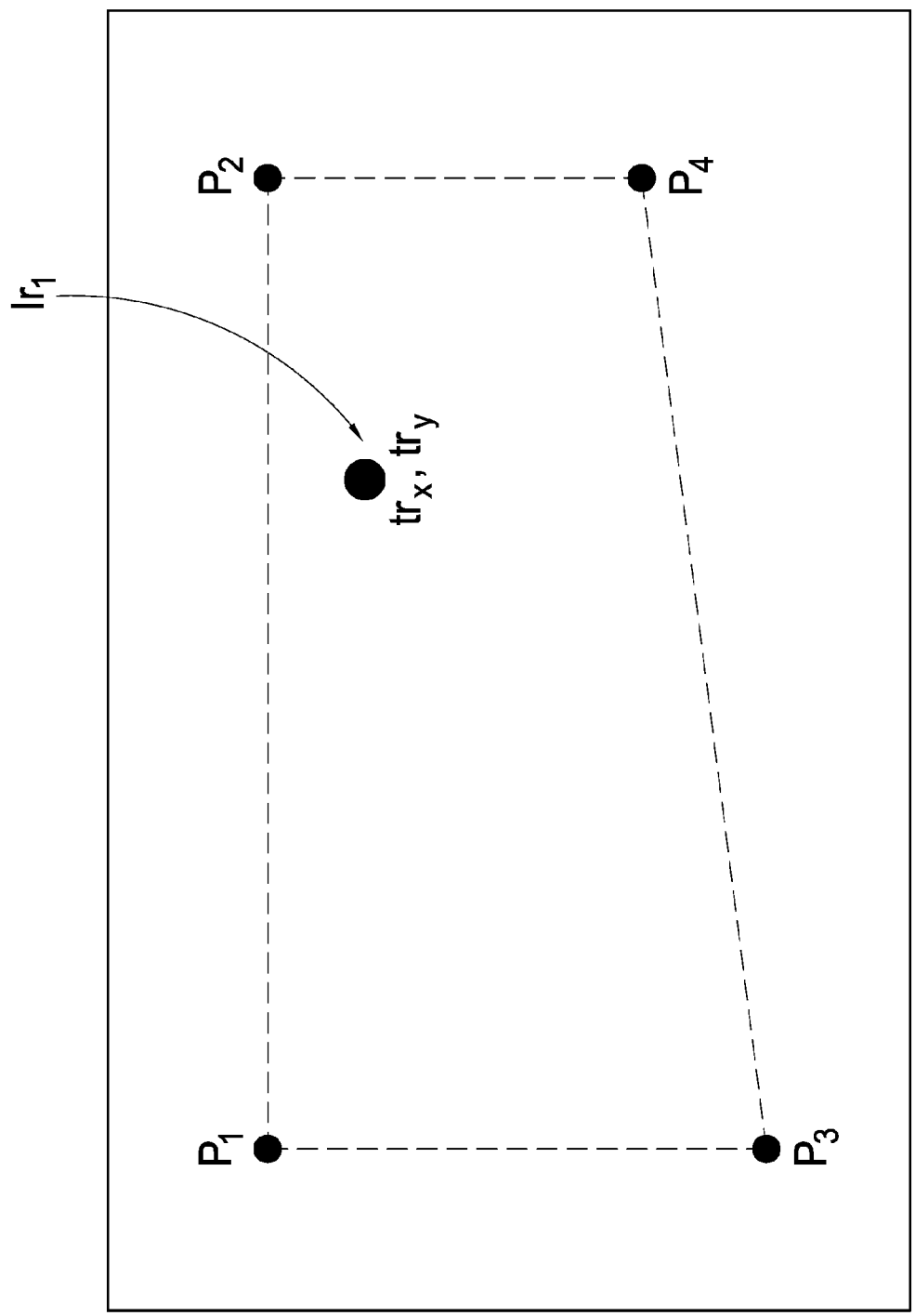
FIG. 5D shows another embodiment of a step in the tracking method of FIG. 5.

In another embodiment, the image processing software compares a frame (see FIG. 5C), in which the non-visible light IR1 from the LTP 40 has not been actuated, with the camera frame in FIG. 5B, in which the non-visible light IR1 from the LTP 40 has been actuated, and uses a frame subtraction algorithm, as discussed above, to filter out sources of non-visible light that are not associated with the LTP 40, resulting in the image on FIG. 5D, where non-visible light from other than the LTP 40 has been filtered out. In some embodiments, the image processing software can further use an algorithm to confirm that the remaining non-visible light on the screen 50 corresponds to the light from the LTP 40. For example, as discussed above, the software can search for a group of pixels that form a dot (e.g., generally circular shape) with the highest concentration or density of pixels, while considering the intensity values.

Once the location of the non-visible light IR1 from the LTP 40 is detected (e.g., at location $t_x$, $t_y$ in FIG. 5B or FIG. 5D), the tracking software expresses 450 the position of the non-visible light dot IR1 as a proportion of the quadrangle (P1-P4). In one embodiment, shown in FIG. 5E, this is done by projecting a line from one of the corners (e.g., P1) of the quadrangle through the detected location ($t_x$, $t_y$) of the non-visible light dot IR1 (e.g., IR light dot), calculating where it intersects the opposite side of the quadrangle (P1-P4), and expressing said intersection on the opposite side of the quadrangle (P1-P4) as a proportion of the distance L2 along said opposite side (e.g., Y1/Y2); this process of projecting a line from a corner through the detected location of the non-visible light dot and calculating the intersection of the line on an opposite side of the quadrangle and expressing it as a proportional distance along said opposite side can be repeated for one or more other corners of the quadrangle (P1-P4).

Figure 5E:
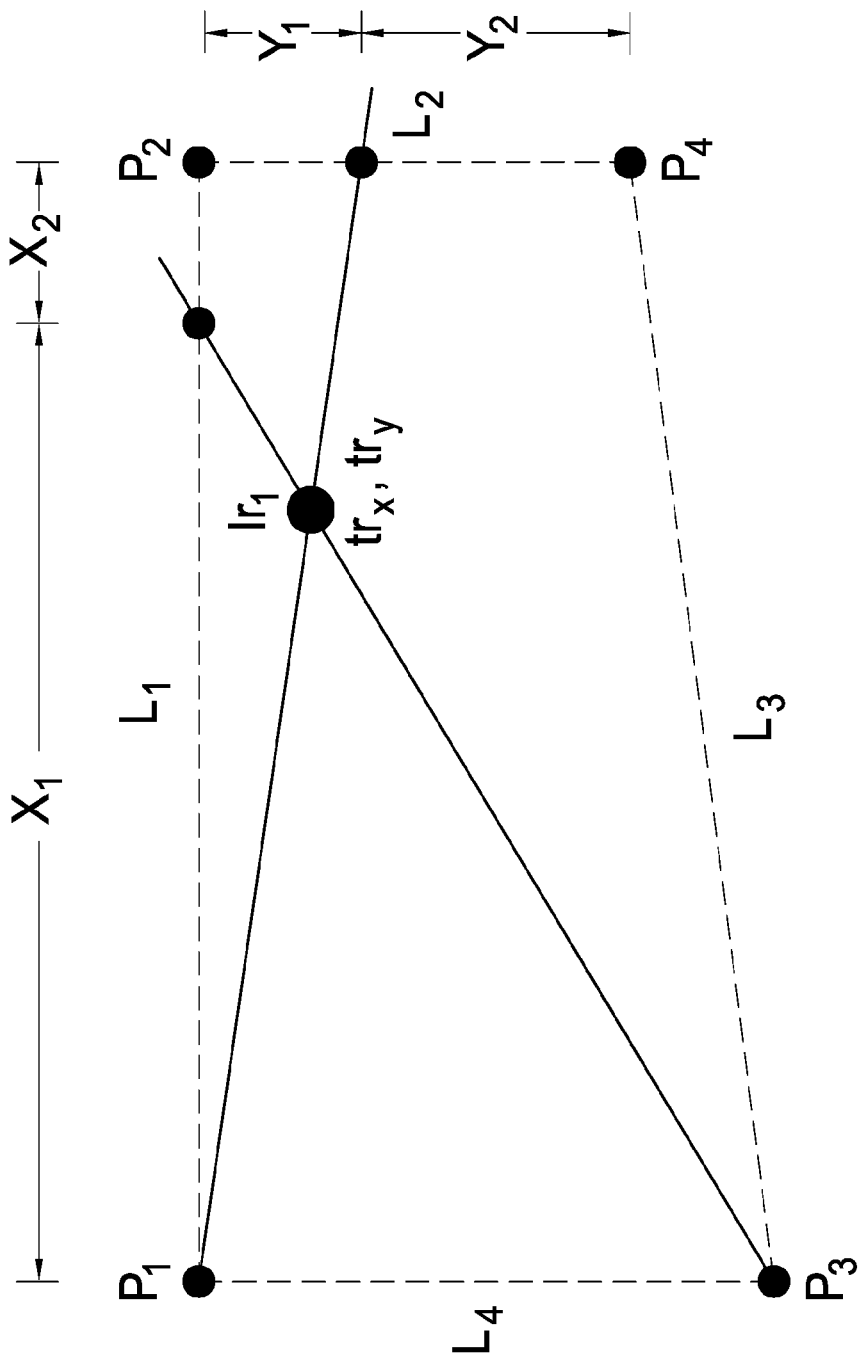
FIG. 5E shows a step in the tracking method of FIG. 5.
Figure 5F:
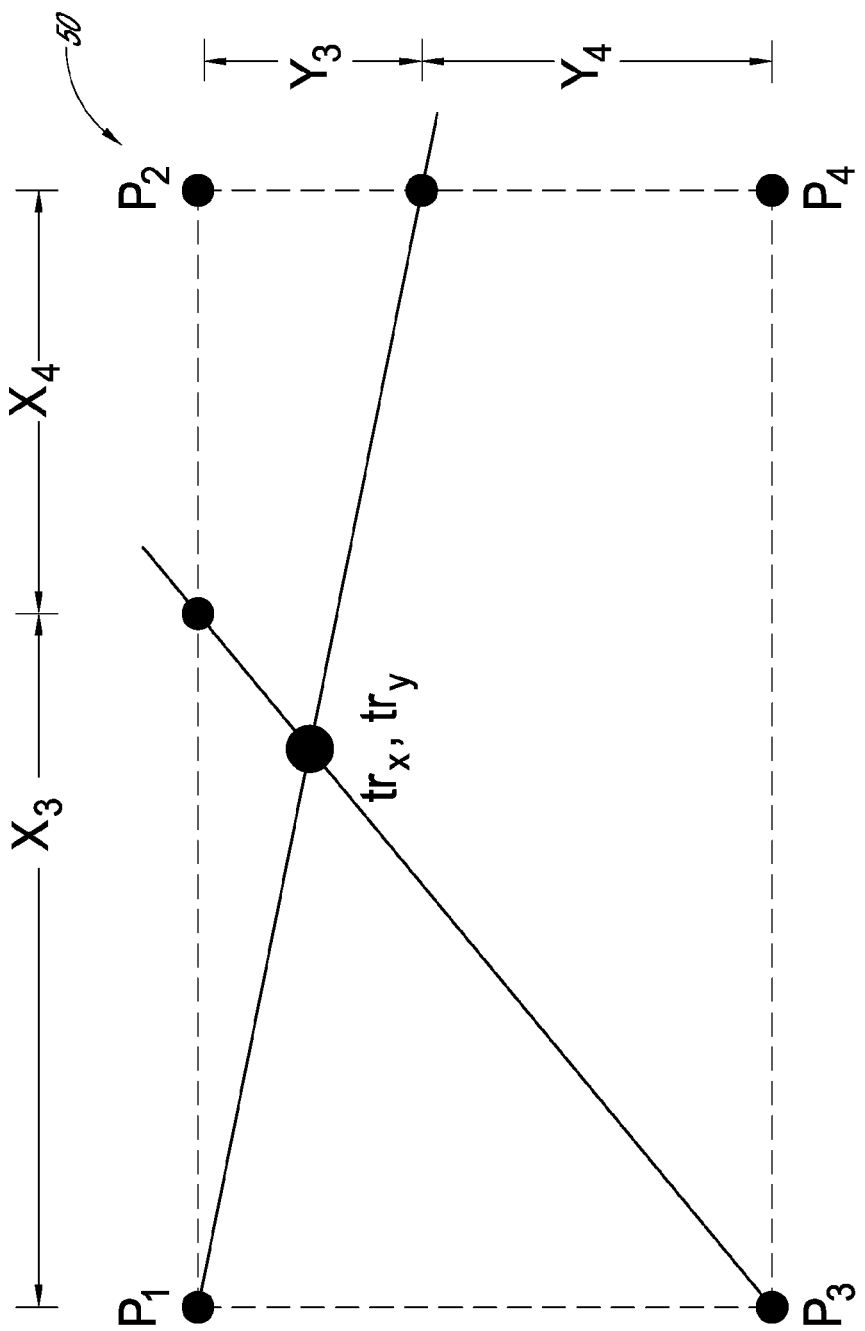
FIG. 5F shows a step in the tracking method of FIG. 5.

As shown in FIG. 5F, the tracking software then maps 470 said proportional distances (e.g., L2*Y1/Y2, L1*X1/X2 in FIG. 5E) on the sides of the quadrangle (P1-P4) onto the display screen 50 to identify intersection points along corresponding borders of the display screen 50 (e.g., X1/X2 and Y1/Y2 in FIG. 5E is equal to X3/X4 and Y3/Y4 in FIG. 5F, respectively). Lines are then calculated 490 from said intersection points to one or more corners (e.g., P1, P3) of the display screen 50 opposite the intersection location, and the intersection point of all the lines corresponds to the location ($t_{rx}$, $t_{ry}$) of the non-visible light dot (e.g., IR light dot) on the display screen 50.

In the tracking process described above, only two lines need to be drawn from corners of the quadrangle (P1-P4) through the detected location ($t_x$, $t_y$) of the non-visible light dot and onto opposite sides of the quadrangle, which can then be translated to the display screen 50 as discussed above to translate the camera view to the display screen 50 or "game space". However, use of four lines (one from each of the corners of the quadrangle) that intersect the detected non-visible light dot location can improve the accuracy of providing the non-visible light dot location on the display screen 50 and provides for error redundancy.

In one embodiment, the non-visible light (e.g., IR light) is continually projected by the LTP 40, and the software is constantly tracking the non-visible light dot, but can in one embodiment only record its position once the trigger 46 on the LTP 40 is actuated. In another embodiment, the non-visible light is continually projected by the LTP 40, but the light is switched off when the trigger 46 is actuated; in this embodiment, the tracking software searches the feed from the camera 20 for the location where the non-visible light dot is missing, and translates this location to the display screen 50, as discussed above. Advantageously, this method of continually projecting the non-visible light and recording only when the trigger 46 is actuated provides a relatively fast system response (e.g., minimum latency) from the actuation of the trigger 46 to the video game providing feedback to the user (e.g., visual and/or audio feedback). However, the location of the non-visible light dot that is recorded corresponds to a location where the LTP 40 was pointed a fraction of a second prior, and one or more batteries of the LTP 40 may drain more quickly (e.g., where the LTP 40 is wireless) since the non-visible light would be constantly projected.

In another embodiment, the non-visible light is only projected by the LTP 40 when the trigger 46 is actuated. The software then searches the feed from the camera 20 to identify the non-visible light dot, as discussed above. Advantageously, this method results in increased accuracy of the actual position when the trigger 46 is actuated, and the one or more batteries of the LTP 40 (e.g., where the LTP 40 is wireless) may drain more slowly since the light is only projected when the trigger 46 is actuated. However, due to the latency in reviewing the feed from the camera 20, it may take several milliseconds for the non-visible light dot to be identified in the camera feed and communicated to the console 10, which may increase the latency for the user to receive feedback (e.g., visual and/or audio feedback) following the actuation of the trigger 46.

Light Targeting Peripheral

Figure 6A:
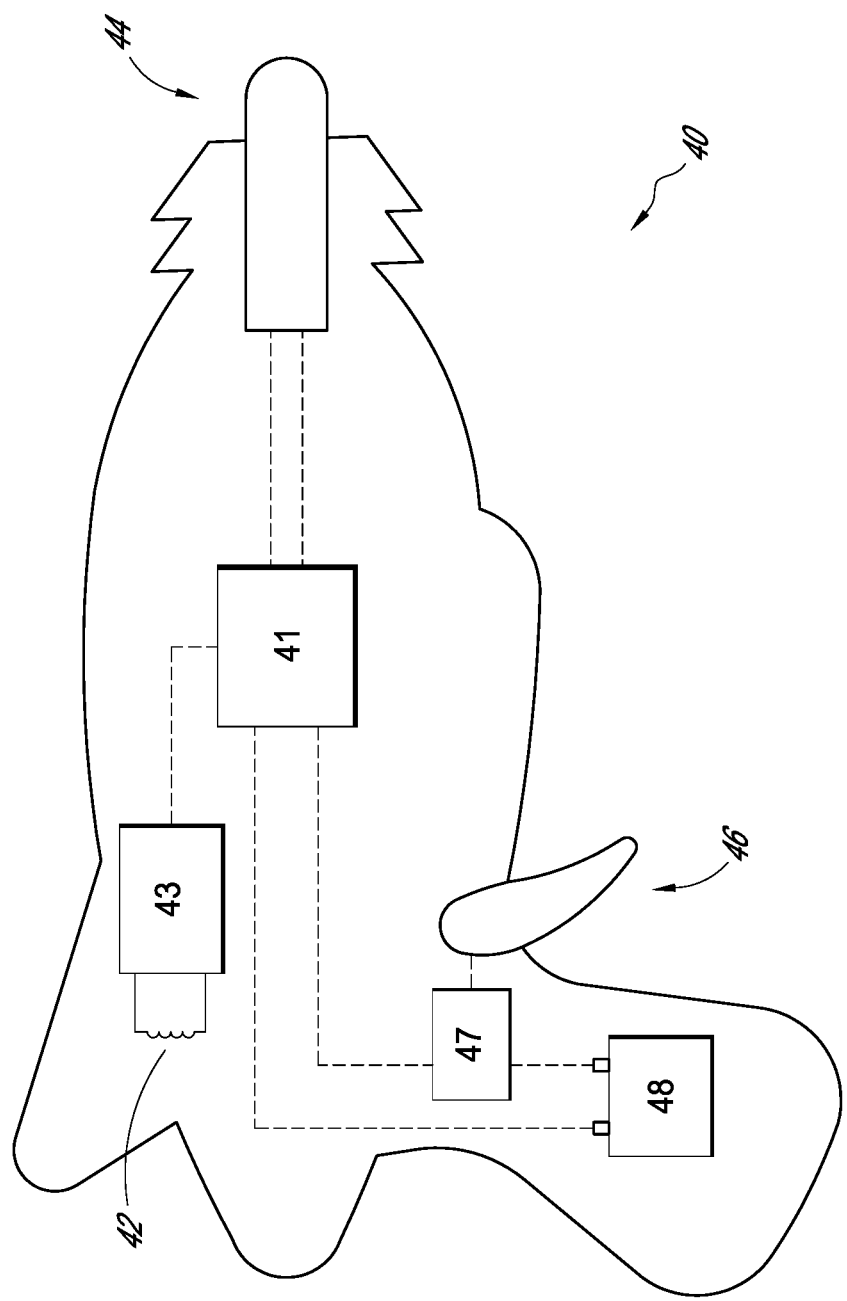
FIG. 6A is a schematic block diagram of the electronics of a light targeting peripheral used with the video gaming system of FIG. 1.

FIG. 6A shows a schematic diagram of the electronics in the LTP 40. The LTP 40 can have a light source or emitter 44, as discussed above, which can be electrically connected to control circuitry 41. The control circuitry 41 can be electrically connected to a communication module 43, which optionally includes a wireless transmitter 42 (e.g., an RF transmitter or transceiver), as discussed above. The LTP 40 can also have a switch 47 that is actuated by the trigger 46 and that communicates with the control circuitry 41 to indicate when the trigger 46 has been actuated. The LTP 40 can also have one or more batteries 48 that can power the electronics, including the control circuitry 41, communication module 43 and switch 47. In one embodiment, as discussed above, the LTP 40 can have one or more sensors, which can be part of the control circuitry 41. The LTP 40 can have a connector 45 to optionally removably couple an accessory to the LTP 40. As shown in FIG. 6A, the connector 45 can be a threaded portion 45. However, other suitable connectors (e.g., pin-slot arrangement, twist-lock arrangement, press-fit connection) can be used.

Figure 6B:
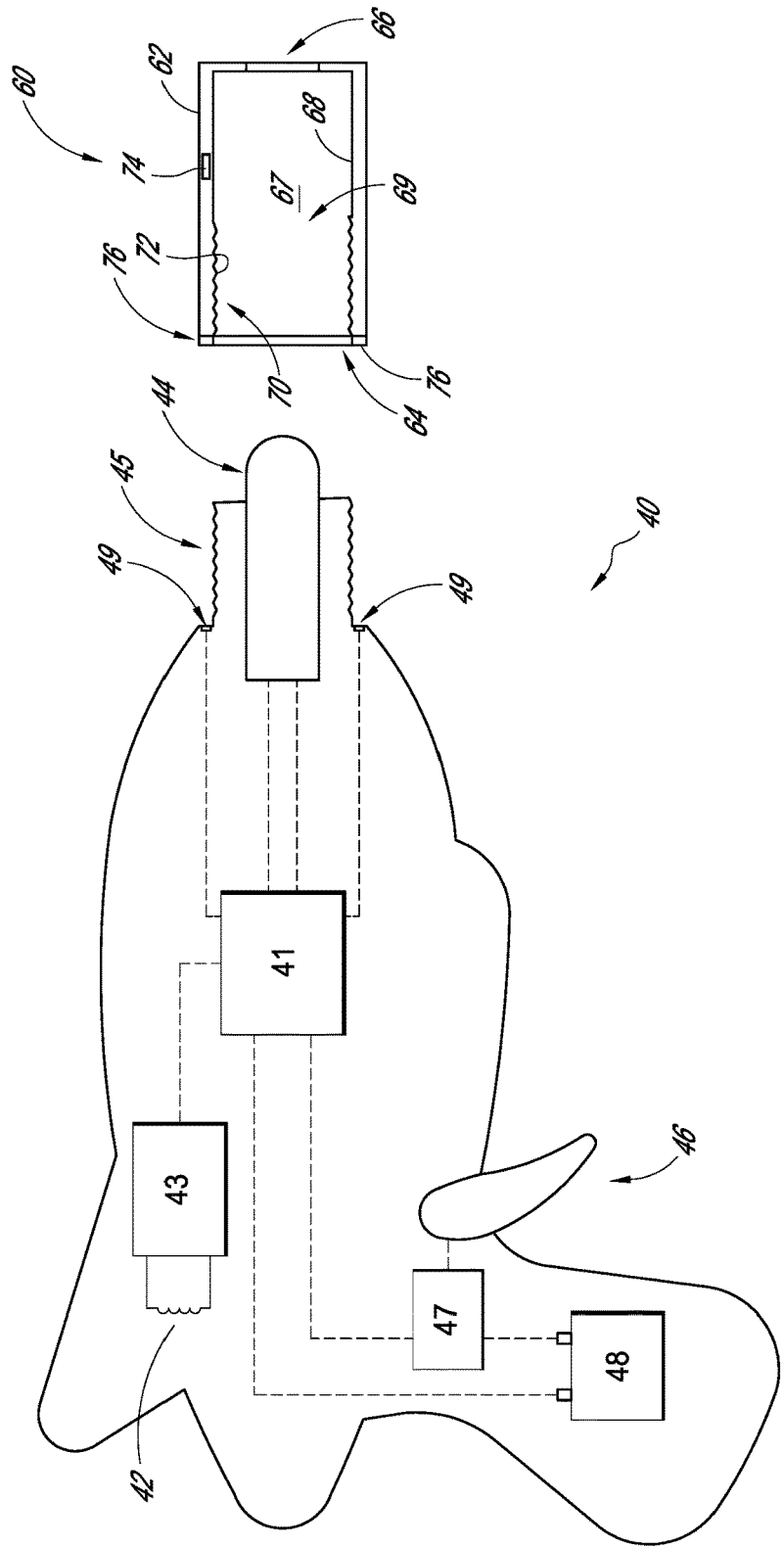
FIG. 6B is a schematic exploded view of the light targeting peripheral of FIG. 6A with a detachable accessory.
Figure 6C:
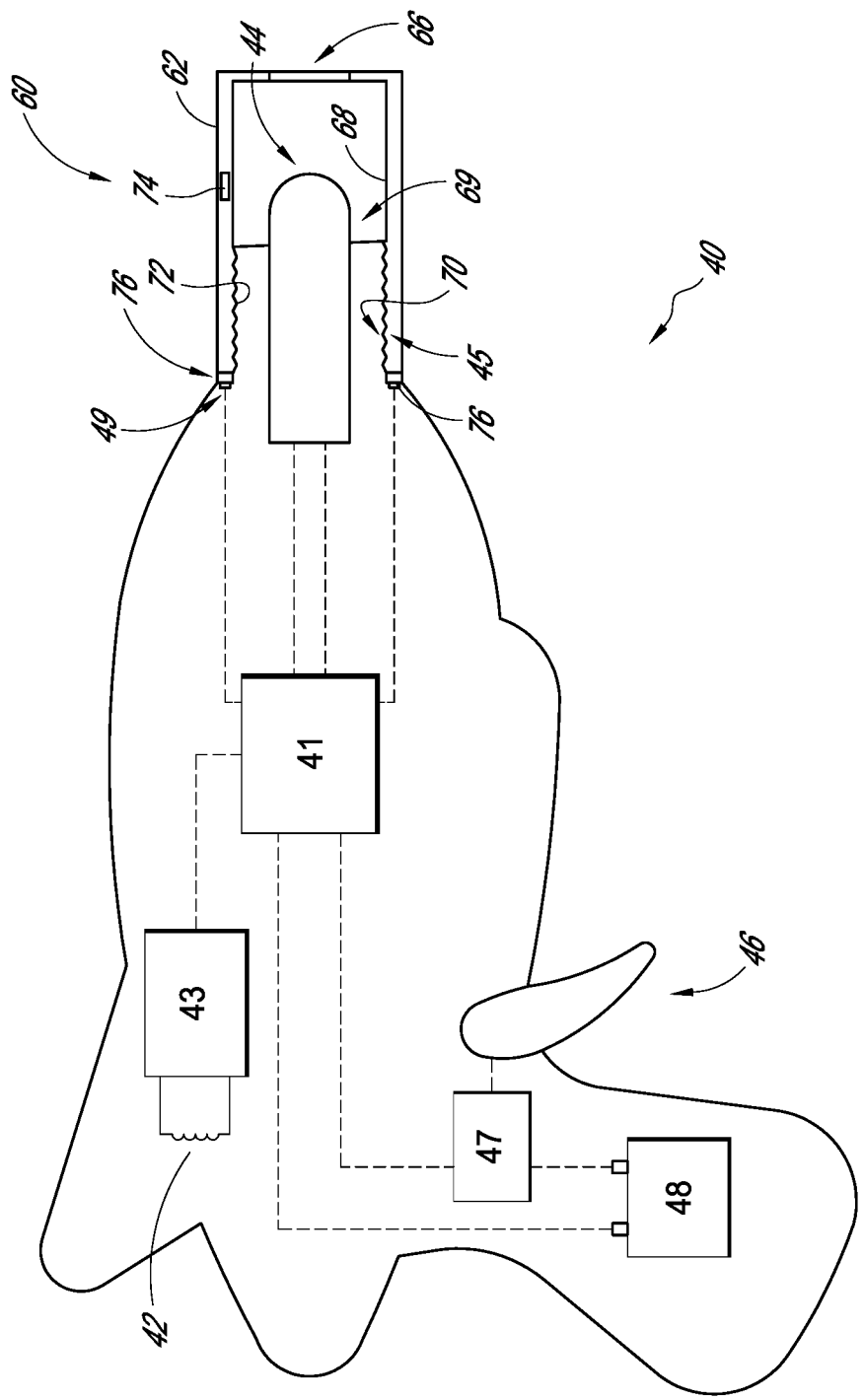
FIG. 6C is a schematic assembled view of the light targeting peripheral coupled to the accessory in FIG. 6B.

FIGS. 6B-6C show the LTP 40 and an accessory 60 that can be removably coupled to the LTP 40. For example, as shown in FIG. 6C, the accessory 60 can be removably coupled to the connector 45 of the LTP 40. Though FIGS. 6B-6C show one accessory 60 that is removably coupled to the LTP 40, one of skill in the art will recognize that the disclosure herein includes coupling of multiple accessories to multiple locations of the LTP 40, and is not limited to the use of a single accessory.

Optionally, the accessory 60 can have a tubular body 62 that extends from a proximal end 64 to a distal end 66, and have a bore 67 that extends through the accessory 60 (e.g., between an open proximal end and open distal end) and is defined by an inner wall 68. The accessory 60 can have a connector 70 that can removably couple with the connector 45 of the LTP 40. Optionally, the connector 70 can be one or more threads 72 defined, for example, in the inner wall 68 that can threadably couple to corresponding threads on the LTP 40 (e.g., threads on a distal end of the LTP 40). Optionally, the accessory 60 can be shaped like a silencer and the LTP 40 can be shaped like a gun (e.g., hand gun, rifle, etc.). Alternatively, the accessory 60 can be shaped like a scope, an extended stock, or other gun accessory. In another embodiment, the LTP 40 can have other suitable shapes (e.g., sword, light saber, etc.) and the accessory 60 can removably couple to the LTP 40 can provide additional functionality, as described further below. The inner wall 68 can optionally be a reflective surface to allow the bore 67 to project the light from the light source 44 through the accessory 60.

Optionally, the LTP 40 can have one or more sensors 49 that communicate with the control circuitry 41. The one or more sensors 49 can sense when the accessory 60 is coupled to the LTP 40 can communicate a signal to the control circuitry 41 indicative of said coupling. The control circuitry 41 can optionally communicate a signal indicative of said coupling (e.g., a "coupling signal") to the game console 10, for example via the communication module 43 and wireless transmitter 42. The game console 10, upon receipt of said coupling signal can apply an audio or visual effect to the video game sound or image, based on said coupling signal.

Optionally, the one or more sensors 49 are contact sensors that contact a surface or portion (e.g., proximal end 64) of the accessory 60. For example, the one or more sensors 49 can be a leafspring switch, tact switch (e.g., push button, tactile switch), etc., whereby when the accessory 60 is attached to the LTP 40, the switch is closed and the signal is transmitted to the control circuitry 41, as discussed previously, and when the accessory is detached from the LTP 40 the switch remains open so that no such coupling signal is transmitted (e.g., to the console 10 via the wireless transmitter 42). The switch can be connected to an input/output (e.g., general purpose input/output, or GPIO) of the control circuitry 41. The control circuitry 41 can include a microcontroller unit (MCU).

Alternatively, the one or more sensors 49 can be proximity sensors that can sense when a surface or portion (e.g., proximal end 64) of the accessory 60 is within a predetermined distance of the sensor. The proximity sensor can communicate a signal to the control circuitry 41 indicative of the accessory 60 being coupled to the LTP 40 when the accessory 60 is disposed within the threshold distance measured by the sensor, and the control circuitry 41 can communicate a signal to the console 10 indicative of the coupling, as discussed above.

Alternatively, the one or more sensors 49 can be Hall effect sensors, and the accessory 60 can have one or more magnets 74 incorporated therein (e.g., in the proximal end 64). When the accessory 60 is coupled to the LTP 40, the one or more magnets in the accessory 60 can trip the hall effect sensor so that a signal is communicated to the control circuitry 41 indicative of the coupling of the accessory 60.

The control circuitry 41 can communicate a signal to the console 10 indicative of the coupling, as discussed above.

Alternatively, the one or more sensors 49 is an RFID reader coil that is electrically connected to the control circuitry 41. One or more separate accessories 60 can attach to the LTP 40, each having a separate passive RFID tag 74 that is "read" by the RFID reader, the RFID reader communicating a signal to the control circuitry 41 depending on the information in the RFID tag, which is then communicated to the console 10 to vary one or more parameters of the video game. For example, one of the accessories 60 can be a silencer, which when coupled to the LTP 40 the RFID reader can read information indicative of the silencer from the accessory's RFID tag. The signal indicative of a silencer is transmitted to the console 10 via the control circuitry 41 and wireless transmitter 42, and the console 10 can optionally vary an audio parameter of the video game based on receipt of the silencer signal. Alternatively, the accessory 60 that is coupled to the LTP 40 can be a scope, which when coupled to the LTP 40 the RFID reader can read information indicative of the scope from the accessory's RFID tag. The signal indicative of the scope is transmitted to the console via the control circuitry 41 and wireless transmitter 42, and the console 10 can optionally vary a visual parameter of the video game based on receipt of the scope signal.

Alternatively, the one or more sensors 49 can be electrical contacts (e.g., a pair of contact points, a pair of concentric rings) on the LTP 40 that are electrically connected to the control circuitry 41. One or more accessories 60 can have different resistors 76 that can electrically couple to the electrical contacts of the LTP 40. When the accessory 60 is coupled to the LTP 40, the control circuitry 41 can "read" the resistance of the resistor in the accessory 60 (e.g., by passing a current through the resistor) to identify the type of accessory it is (e.g., a scope, a silencer). The control circuitry 41 can then communicate a signal indicative of the accessory type to the console 10 (e.g., via the wireless transmitter 42), and the console can optionally vary a parameter of the video game based on the signal received.

With any of the implementations described above, once the accessory 60 is coupled to the LTP 40, the control circuitry 41 can communicate a signal indicative of the accessory 60, as described above, to the console 10, for example via the wireless transmitter 42. Upon receipt of said signal, the console 10 can vary an operating parameter of the video game software based on the signal.

For example, where the accessory 60 is a silencer and the control circuitry 41 transmits a signal indicative of the silencer to the console 10, the console 10 can reduce the volume of or otherwise muffle the shot sound when the user actuates the trigger 46. In another example, where the accessory 60 is a scope and the control circuitry 41 transmits a signal indicative of the scope to the console 10, the console 10 can operate the video game to provide one or more visual effects (e.g., enlarged view of the video game scene) associated with the scope signal. In still another example, where the accessory 60 is an increased power device (e.g., "power crystal" for a laser weapon), the console can operate the video game to provide one or more effects (e.g., increased damage/destruction) associated with the increased power device.

Figure 7:
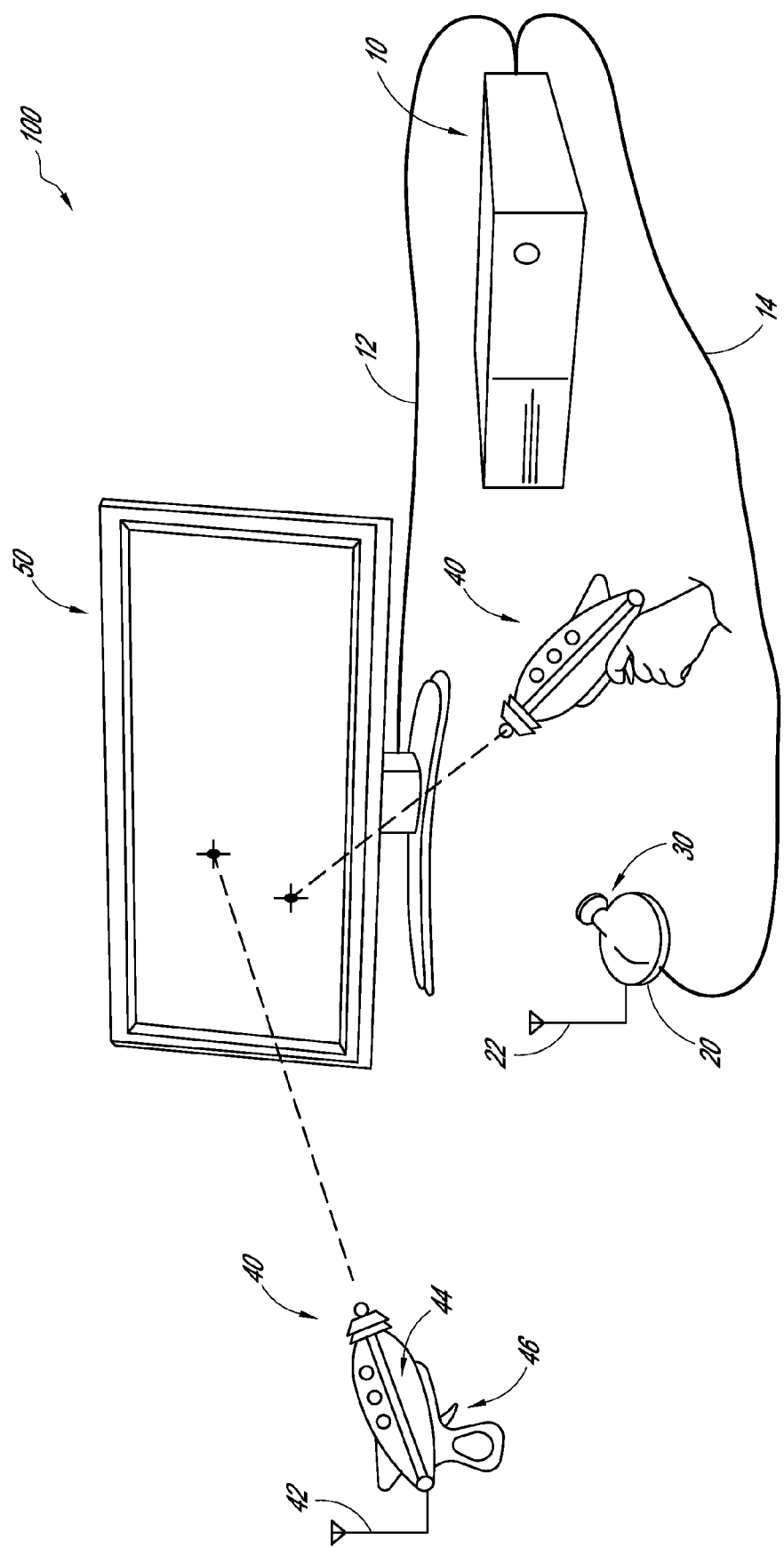
FIG. 7 is a schematic drawing of the video gaming system in use by two individuals during use.

Though FIG. 1 shows a single LTP 40, one of skill in the art will recognize that more than one LTP 40 can be utilized while playing the video game (e.g., two LTPs 40, four LTPs 40), depending on the number of players, as shown in FIG. 7. As discussed above, the LTP 40 can communicate with one or both of the camera 20 and console 10 via an RF link.

To accommodate multiple users during a video game, the system 100 can utilize a time division multiplexing method so that the multiple LTPs 40 are not all allowed to be actuated at the same time.

The console 10 can optionally have one or more processors, a communication interface, a main memory, a ROM and a storage device, which can be connected to a bus.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A light targeting peripheral for use with a video game console to play a video game, comprising:
    a gun-shaped housing having a handle and barrel that are defined by a single piece,
    a non-visible light source at least partially disposed in the gun-shaped housing,
    a trigger movably coupled to the gun-shaped housing, the trigger being actuatable by a user to move relative to the housing to actuate the non-visible light source,
    a switch disposed at least partially in the gun-shaped housing and in communication with the trigger and configured to generate a trigger signal when the trigger is depressed by the user,
    circuitry housed in the gun-shaped housing and electrically connected to the switch and configured to receive the trigger signal from the switch,
    an accessory coupleable to the gun-shaped housing, the accessory being a single hollow tube with a proximal open end and a distal open end, the proximal open end of the hollow tube configured to extend over a distal end of and couple to a distal portion of the barrel when the accessory is coupled to the gun-shaped housing and so that the hollow tube is co-axial with the non-visible light source and the non-visible light source extends at least partially into the hollow tube,
    one or more sensors disposed on or in the gun-shaped housing and configured to sense when the accessory is coupled to the gun-shaped housing and to communicate an accessory signal indicative of said accessory coupling to the circuitry, the accessory configured to allow the non-visible light to pass therethrough, and
    a communication module housed in the housing and configured to communicate with the circuitry and with the video game console,
    wherein the circuitry is configured to transmit a first signal to the video game console via the communication module corresponding to the trigger signal, the circuitry further configured to transmit a second signal to the video game console via the communication module corresponding to the accessory signal to adjust an operating parameter of a video game operated by the video game console.

2. The light targeting peripheral of claim 1, wherein the non-visible light source is an infrared light source.

3. The light targeting peripheral of claim 1, wherein the communication module comprises a wireless transmitter.

4. The light targeting peripheral of claim 1, wherein the one or more sensors includes a leafspring switch.

5. The light targeting peripheral of claim 1, wherein the one or more sensors includes a hall effect sensor that is tripped when it senses a magnet in the accessory when coupled to the light targeting peripheral.

6. The light targeting peripheral of claim 1, wherein the one or more sensors includes an RFID reader coil electrically connected to the circuitry and configured to read information in an RFID tag embedded in the accessory when the accessory is coupled to the light targeting peripheral.

7. The light targeting peripheral of claim 1, wherein the one or more sensors include electrical contacts electrically connected to the circuitry, the electrical contacts configured to electrically connect with a resistor in the accessory when the accessory is coupled to the light targeting peripheral.

8. The light targeting peripheral of claim 1, wherein the one or more sensors includes a sensor chosen from a group consisting of a leafspring switch, a proximity sensor, a hall effect sensor that is tripped when it senses a magnet in the accessory when coupled to the light targeting peripheral, an RFID reader coil electrically connected to the circuitry and configured to read information in an RFID tag embedded in the accessory when the accessory is coupled to the light targeting peripheral, and electrical contacts electrically connected to the circuitry, the electrical contacts configured to electrically connect with a resistor in the accessory when the accessory is coupled to the light targeting peripheral.

9. A light targeting peripheral for use with a video game console to play a video game, comprising:
a gun-shaped housing having a handle portion and barrel portion that are defined as a single piece,
a non-visible light source at least partially disposed in the gun-shaped housing,
a trigger movably coupled to the gun-shaped housing, the trigger being actuatable by a user to move relative to the housing to actuate the non-visible light source,
a switch disposed at least partially in the gun-shaped housing and in communication with the trigger and configured to generate a trigger signal when the trigger is depressed by the user,
circuitry housed in the gun-shaped housing and electrically connected to the switch and configured to receive the trigger signal from the switch,
an accessory coupleable to the gun-shaped housing, the accessory being a single hollow tube with a proximal open end and a distal open end, the proximal open end of the hollow tube configured to extend over a distal end of and couple to a distal portion of the barrel when the accessory is coupled to the gun-shaped housing and so that the hollow tube is co-axial with the non-visible light source and the non-visible light source extends at least partially into the hollow tube,
one or more sensors disposed on or in the gun-shaped housing and configured to sense when the accessory is coupled to the gun-shaped housing and to communicate an accessory signal indicative of said accessory coupling to the circuitry, and
a communication module housed in the housing and configured to communicate with the circuitry and with the video game console,
wherein the circuitry is configured to transmit a first signal to the video game console via the communication module corresponding to the trigger signal, the circuitry further configured to transmit a second signal to the video game console via the communication module corresponding to the accessory signal to adjust a volume of a game sound associated with a shot corresponding to the trigger signal.

10. The light targeting peripheral of claim 9, wherein the non-visible light source is an infrared light source.

11. The light targeting peripheral of claim 9, wherein the communication module comprises a wireless transmitter.

12. The light targeting peripheral of claim 10, wherein the second signal transmitted to the video game console is configured to adjust a sound attribute of the video game operated by the video game console when the trigger is depressed by the user.

13. A light targeting peripheral for use with a video game console to play a video game, comprising:
a housing having a proximal handle portion and a distal barrel portion that are defined as a single piece,
a non-visible light source at least partially disposed in the housing,
a trigger movably coupled to the housing, the trigger being actuatable by a user to move relative to the housing to actuate the non-visible light source,
a switch disposed at least partially in the housing and in communication with the trigger and configured to generate a trigger signal when the trigger is depressed by the user,
circuitry housed in the housing and electrically connected to the switch and configured to receive the trigger signal from the switch,
an accessory coupleable to the housing, the accessory being a single hollow tube with a proximal open end and a distal open end, the proximal open end of the hollow tube configured to extend over a distal end of and couple to a distal portion of the barrel when the accessory is coupled to the housing and so that the hollow tube is co-axial with the non-visible light source and the non-visible light source extends at least partially into the hollow tube,
one or more sensors disposed on or in the housing and configured to sense when the accessory is coupled to the housing and to communicate an accessory signal indicative of said accessory coupling to the circuitry, and
a communication module housed in the housing and configured to communicate with the circuitry and with the video game console,
wherein the circuitry is configured to transmit a first signal to the video game console via the communication module corresponding to the trigger signal, the circuitry further configured to transmit a second signal to the video game console via the communication module corresponding to the accessory signal to adjust an operating parameter of a video game operated by the video game console.

14. The light targeting peripheral of claim 13, wherein the non-visible light source is an infrared light source.

15. The light targeting peripheral of claim 13, wherein the communication module comprises a wireless transmitter.

16. The light targeting peripheral of claim 13, wherein the one or more sensors includes a sensor chosen from a group consisting of a leafspring switch, a proximity sensor, a hall effect sensor that is tripped when it senses a magnet in the accessory when coupled to the light targeting peripheral, an RFID reader coil electrically connected to the circuitry and configured to read information in an RFID tag embedded in the accessory when the accessory is coupled to the light targeting peripheral, and electrical contacts electrically connected to the circuitry, the electrical contacts configured to electrically connect with a resistor in the accessory when the accessory is coupled to the light targeting peripheral.

17. The light targeting peripheral of claim 13, wherein the second signal transmitted to the video game console is configured to adjust a sound attribute of the video game operated by the video game console when the trigger is depressed by the user.

* * * * *